US012045005B2

(12) United States Patent
Koishi et al.

(10) Patent No.: US 12,045,005 B2
(45) Date of Patent: Jul. 23, 2024

(54) CARTRIDGE ASSEMBLY

(71) Applicant: CANON KABUSHIKI KAISHA, Tokyo (JP)

(72) Inventors: Isao Koishi, Kanagawa (JP); Naoki Hayashi, Kanagawa (JP); Masanari Morioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/946,068

(22) Filed: Sep. 16, 2022

(65) Prior Publication Data

US 2023/0082891 A1 Mar. 16, 2023

(30) Foreign Application Priority Data

Sep. 16, 2021 (JP) ................................ 2021-151117

(51) Int. Cl.
*G03G 21/18* (2006.01)
*G03G 21/16* (2006.01)

(52) U.S. Cl.
CPC ..... *G03G 21/1821* (2013.01); *G03G 21/1671* (2013.01); *G03G 21/181* (2013.01)

(58) Field of Classification Search
CPC ........... G03G 21/1821; G03G 21/1671; G03G 21/181; G03G 21/1825; G03G 21/1842; G03G 21/1623
See application file for complete search history.

(56) References Cited

U.S. PATENT DOCUMENTS 6,704,522 B2 3/2004 Sasago et al.
6,714,746 B2 3/2004 Morioka et al.
6,898,399 B2 5/2005 Morioka et al.
6,937,832 B2 8/2005 Sato et al.
6,963,706 B2 11/2005 Morioka et al.
7,003,247 B2 2/2006 Koishi et al.
7,072,601 B2 7/2006 Kakitani et al.
7,079,787 B2 7/2006 Ogino et al.
7,127,192 B2 10/2006 Batori et al.
7,139,502 B2 11/2006 Koishi et al.
7,158,749 B2 1/2007 Ueno et al.
(Continued)

FOREIGN PATENT DOCUMENTS

JP 2004-077820 A 3/2004

OTHER PUBLICATIONS

Copending U.S. Appl. No. 17/986,997, filed Nov. 15, 2022.
(Continued)

*Primary Examiner* — Sandra Brase
(74) *Attorney, Agent, or Firm* — Venable LLP

(57) ABSTRACT

In a cartridge assembly, a cartridge frame is configured to limit a movable amount of a photosensitive drum with respect to the frame in a longitudinal direction of the photosensitive drum to a first amount in the case where a cover member is apart from the frame, and the cover member has a held portion held by the frame and a limiting portion configured to limit the movable amount of the photosensitive drum with respect to the frame to a second amount smaller than the first amount by contacting with a longitudinal end surface of the photosensitive drum in the case where the photosensitive drum moves in the longitudinal direction when the cover member is mounted on the frame.

9 Claims, 30 Drawing Sheets

(56) References Cited

U.S. PATENT DOCUMENTS

| | | | |
|---|---|---|---|
| 7,184,690 B2 | 2/2007 | Ueno et al. | |
| 7,200,349 B2 | 4/2007 | Sato et al. | |
| 7,315,710 B2 | 1/2008 | Ueno et al. | |
| 7,418,225 B2 | 8/2008 | Morioka et al. | |
| 7,457,566 B2 | 11/2008 | Koishi et al. | |
| 7,813,671 B2 | 10/2010 | Nittani et al. | |
| 7,856,192 B2 | 12/2010 | Koishi et al. | |
| 7,890,012 B2 | 2/2011 | Koishi et al. | |
| 8,135,304 B2 | 3/2012 | Abe et al. | |
| 8,139,979 B2 | 3/2012 | Koishi et al. | |
| 8,270,876 B2 | 9/2012 | Morioka et al. | |
| 8,275,286 B2 | 9/2012 | Ueno et al. | |
| 8,280,278 B2 | 10/2012 | Ueno et al. | |
| 8,295,734 B2 | 10/2012 | Ueno et al. | |
| 8,422,914 B2 | 4/2013 | Hayashi et al. | |
| 8,437,669 B2 | 5/2013 | Morioka et al. | |
| 8,452,210 B2 | 5/2013 | Ueno et al. | |
| 8,472,840 B2 | 6/2013 | Abe et al. | |
| 8,478,166 B2 | 7/2013 | Hara et al. | |
| 8,526,841 B2 | 9/2013 | Koishi et al. | |
| 8,532,533 B2 | 9/2013 | Ueno et al. | |
| 8,630,564 B2 | 1/2014 | Ueno et al. | |
| 8,676,090 B1 | 3/2014 | Ueno et al. | |
| 8,682,215 B1 | 3/2014 | Ueno et al. | |
| 8,688,008 B2 | 4/2014 | Norioka et al. | |
| 8,781,355 B2 | 7/2014 | Koishi | |
| 8,862,015 B2 | 10/2014 | Koishi et al. | |
| 9,025,998 B2 | 5/2015 | Morioka et al. | |
| 9,128,417 B2 | 9/2015 | Yamasaki et al. | |
| 9,176,468 B2 | 11/2015 | Ueno et al. | |
| 9,213,306 B2 | 12/2015 | Morioka et al. | |
| 9,256,161 B2 | 2/2016 | Hayashi et al. | |
| 9,274,499 B2 | 3/2016 | Morioka et al. | |
| 9,377,716 B2 | 6/2016 | Yamasaki et al. | |
| 9,395,679 B2 | 7/2016 | Kawakami et al. | |
| 9,423,767 B2 | 8/2016 | Fujino et al. | |
| 9,465,318 B2 | 10/2016 | Takeuchi et al. | |
| 9,501,031 B2 | 11/2016 | Hayashi et al. | |
| 9,523,942 B2 | 12/2016 | Takeuchi et al. | |
| 9,632,451 B2 | 4/2017 | Hayashi et al. | |
| 9,678,471 B2 | 6/2017 | Ueno et al. | |
| 9,684,261 B2 | 6/2017 | Miyabe et al. | |
| 9,703,257 B2 | 7/2017 | Morioka et al. | |
| 9,733,614 B2 | 8/2017 | Ueno et al. | |
| 9,746,826 B2 | 8/2017 | Ueno et al. | |
| 9,772,602 B2 | 9/2017 | Ueno et al. | |
| 9,785,091 B2 | 10/2017 | Fukasawa et al. | |
| 9,791,825 B2 | 10/2017 | Kamoshida et al. | |
| 9,817,333 B2 | 11/2017 | Morioka et al. | |
| 9,823,619 B2 | 11/2017 | Kawakami et al. | |
| 9,836,015 B2 | 12/2017 | Morioka et al. | |
| 9,836,021 B2 | 12/2017 | Ueno et al. | |
| 9,841,724 B2 | 12/2017 | Morioka et al. | |
| 9,841,727 B2 | 12/2017 | Ueno et al. | |
| 9,841,728 B2 | 12/2017 | Ueno et al. | |
| 9,841,729 B2 | 12/2017 | Ueno et al. | |
| 9,846,408 B2 | 12/2017 | Ueno et al. | |
| 9,851,685 B2 | 12/2017 | Morioka et al. | |
| 9,851,688 B2 | 12/2017 | Morioka et al. | |
| 9,857,764 B2 | 1/2018 | Ueno et al. | |
| 9,857,765 B2 | 1/2018 | Ueno et al. | |
| 9,857,766 B2 | 1/2018 | Morioka et al. | |
| 9,864,331 B2 | 1/2018 | Ueno et al. | |
| 9,864,333 B2 | 1/2018 | Ueno et al. | |
| 9,869,960 B2 | 1/2018 | Ueno et al. | |
| 9,874,846 B2 | 1/2018 | Ueno et al. | |
| 9,874,854 B2 | 1/2018 | Ueno et al. | |
| 9,886,002 B2 | 2/2018 | Morioka et al. | |
| 9,939,776 B2 | 4/2018 | Morioka et al. | |
| 9,989,892 B2 | 6/2018 | Takeuchi et al. | |
| 10,133,215 B2 | 11/2018 | Fukasawa et al. | |
| 10,168,665 B2 | 1/2019 | Miyabe et al. | |
| 10,203,652 B2 | 2/2019 | Kamoshida et al. | |
| 10,209,670 B2 | 2/2019 | Ueno et al. | |
| 10,353,339 B2 | 7/2019 | Koishi et al. | |
| 10,386,751 B2 | 8/2019 | Hayashi et al. | |
| 10,427,867 B2 | 10/2019 | Koishi et al. | |
| 10,429,794 B2 | 10/2019 | Ueno et al. | |
| 10,520,887 B2 | 12/2019 | Morioka et al. | |
| 10,539,924 B2 | 1/2020 | Ueno et al. | |
| 10,551,793 B2 | 2/2020 | Ueno et al. | |
| 10,585,391 B2 | 3/2020 | Ueno et al. | |
| 10,620,582 B2 | 4/2020 | Morioka et al. | |
| 10,635,045 B2 | 4/2020 | Kawakami et al. | |
| 10,671,015 B2 | 6/2020 | Kamoshida et al. | |
| 10,671,018 B2 | 6/2020 | Ueno et al. | |
| 10,705,481 B2 | 7/2020 | Sugimoto et al. | |
| 10,712,709 B2 | 7/2020 | Morioka et al. | |
| 10,712,710 B2 | 7/2020 | Morioka et al. | |
| 10,788,789 B2 | 9/2020 | Morioka et al. | |
| 10,788,790 B2 | 9/2020 | Morioka et al. | |
| 10,795,312 B2 | 10/2020 | Morioka et al. | |
| 10,816,931 B2 | 10/2020 | Morioka et al. | |
| 10,845,756 B2 | 11/2020 | Ueno et al. | |
| 10,877,433 B2 | 12/2020 | Ueno et al. | |
| 11,048,207 B2 | 6/2021 | Kimura et al. | |
| 11,061,369 B2 | 7/2021 | Miyabe et al. | |
| 11,067,949 B2 | 7/2021 | Miyabe et al. | |
| 11,156,956 B2 | 10/2021 | Ueno et al. | |
| 11,163,259 B2 | 11/2021 | Kawakami et al. | |
| 11,199,807 B2 | 12/2021 | Kamoshida et al. | |
| 11,204,584 B2 | 12/2021 | Morioka et al. | |
| 11,237,517 B2 | 2/2022 | Ueno et al. | |
| 11,256,209 B2 | 2/2022 | Kimura et al. | |
| 11,500,327 B2 | 11/2022 | Miyabe et al. | |
| 2010/0209137 A1* | 8/2010 | Takiguchi .......... | G03G 21/1821 399/113 |
| 2011/0038649 A1 | 2/2011 | Miyabe et al. | |
| 2013/0336674 A1 | 12/2013 | Abe et al. | |
| 2015/0063867 A1* | 3/2015 | Yasumoto .......... | G03G 21/1828 399/114 |
| 2015/0117902 A1* | 4/2015 | Kanai ................ | G03G 21/1842 399/114 |
| 2016/0077485 A1* | 3/2016 | Sproul ............... | G03G 21/1821 399/117 |
| 2021/0109479 A1 | 4/2021 | Kubo et al. | |
| 2021/0311432 A1 | 10/2021 | Morioka et al. | |
| 2021/0382434 A1 | 12/2021 | Morioka et al. | |
| 2021/0389720 A1 | 12/2021 | Kawakami et al. | |
| 2022/0043389 A1 | 2/2022 | Kamoshida et al. | |
| 2022/0075312 A1 | 3/2022 | Ozaki et al. | |
| 2022/0075314 A1 | 3/2022 | Ueno et al. | |
| 2022/0137551 A1 | 5/2022 | Kimura et al. | |

OTHER PUBLICATIONS

Copending U.S. Appl. No. 18/073,733, filed Dec. 2, 2022.
Copending U.S. Appl. No. 17/988,057, filed Nov. 16, 2022.
Copending U.S. Appl. No. 17/988,064, filed Nov. 16, 2022.

* cited by examiner

A-A

B-B (Non-Gear Side) C-C

D-D

C-C (Gear Side) T2=0 T3=0 (Non-Gear Side)

A-A

T1=0 (Non-Gear Side)

B-B

A-A

B-B (Gear Side) u1+u2<s1+s2 (Non-Gear Side)

A-A

T1=0 (Non-Gear Side)

B-B

DT1

DT2

CARTRIDGE ASSEMBLY

BACKGROUND OF THE INVENTION

Field of the Invention

The present disclosure relates to a cartridge assembly to be installed in an image forming apparatus such as a copier or printer that employs an electrophotographic method.

Description of the Related Art

A device configuration of an image forming apparatus that employs a so-called process cartridge system is known. In such configuration, a photosensitive drum is rotatably supported by a drum unit of a process cartridge, and a part of the surface of the photosensitive drum is exposed through an opening of a cartridge frame. Therefore, the user may come into contact with the surface of the photosensitive drum. When the user touches the surface of the photosensitive drum, oil and the like from the user's hands adheres to the surface of the photosensitive drum, which may cause image defects. In some cases, the surface of the photosensitive drum is covered with a cover member (drum cover member) to prevent a user from touching the surface of the photosensitive drum. The drum cover member serves to prevent dust and contact with the user.

Also, when performing maintenance such as jam processing, there are times when the cartridge once mounted on the main unit is removed and temporarily stored outside the main unit. At that time, there is a possibility that the user will reattach the drum cover member. In this case, similarly to the above, by covering the surface of the photosensitive drum with the drum cover member, dust and user contact can be prevented.

Until the cartridge reaches the user, the cartridge is packed with packing materials and cushioning materials made of cardboard and the like and transported. A photosensitive drum and a charging member, which are process means, are rotatably supported via bearing members and support members joined to a cartridge frame. The photosensitive drum and the charging member are installed with a longitudinal clearance relative to other parts so as to stably rotate during printing, thereby preventing interference between the parts. The clearance is set to an amount that takes into account variations in the dimensions of the parts and heat shrinkage due to environmental fluctuations so as to enable use in a variety of environments. Therefore, there is a possibility that the charging member may move through the clearance and rub against the photosensitive drum during transportation. In some cases, triboelectric charging occurs on the photosensitive drum, which may cause image defects such as horizontal streaks. Also, if the clearance is large, it is conceivable that the parts may break due to the impact caused by the movement of the parts.

In view of such possibilities, Japanese Patent Application Publication No. 2004-077820 proposes a locking member for limiting longitudinal movement of a brush unit that is configured to move in the longitudinal direction of a photosensitive member while being in contact with the photosensitive member in a cartridge. The locking member is configured to be detachable from a brush supporting member of the cartridge removed from the main body of the image forming apparatus and is configured to prevent the brush unit from moving in the longitudinal direction by limiting the movement of the brush supporting member at the time of mounting.

SUMMARY OF THE INVENTION

An object of the present invention is to provide a technique capable of limiting the longitudinal movement of a photosensitive drum during transportation or storage of a process cartridge.

In order to achieve the above object, the cartridge assembly in the present invention is a cartridge assembly comprising:

a cartridge including:

a photosensitive drum; and a frame rotatably supporting the photosensitive drum and covering the photosensitive drum so as to expose a portion of peripheral surface of the photosensitive drum; and a cover member covering a part of the portion of the photosensitive drum and be attachable and detachable to the frame, wherein the frame is configured to limit a movable amount of the photosensitive drum with respect to the frame in a longitudinal direction of the photosensitive drum to a first amount in the case where the cover member is apart from the frame, wherein the cover member includes:

a held portion held by the frame; and a limiting portion configured to limit the movable amount to a second amount smaller than the first amount by contacting with the photosensitive drum in a case where the photosensitive drum moves in the longitudinal direction.

According to the present invention, longitudinal movement of the photosensitive drum during transportation and storage of the process cartridge can be restricted.

Further features of the present invention will become apparent from the following description of exemplary embodiments with reference to the attached drawings.

DESCRIPTION OF THE EMBODIMENTS

In the following examples, embodiments according to the present disclosure will be illustratively described. However, the configurations disclosed in the following examples, for example, functions, materials, shapes of components, and their relative arrangements, show an example of a form related to the scope of claims and are not intended to limit the scope of claims to those disclosed in these examples. Further, the problem to be solved by the configurations disclosed in the following examples or the operations or effects obtained from the disclosed configurations are not intended to limit the scope of claims.

Embodiment 1

An electrophotographic image forming apparatus according to Embodiment 1 of the present disclosure will be described hereinbelow with reference to the drawings. Here, an electrophotographic image forming apparatus (hereinafter referred to as an image forming apparatus) forms an image on a recording material using an electrophotographic image forming method. Examples of image forming apparatuses include copiers, facsimile machines, printers (laser beam printers, LED printers, etc.), multifunction machines (multi-function printers), and the like. Recording materials include sheet-shaped recording media such as recording paper and plastic sheets. Further, the image forming apparatus according to the present embodiment uses a so-called cartridge system. A cartridge is a unit that can be attached to and detached from an image forming apparatus and is a unit that includes a photosensitive member and process means (for example, a charging member, a developing member, a cleaning member, and the like) acting on the photosensitive member. In the following embodiments, a laser beam printer to which four process cartridges (cartridges) can be detachably attached is exemplified as an image forming apparatus. This number of process cartridges to be mounted on the image forming apparatus is not limiting and may be set as appropriate and necessary.

Schematic Configuration of Image Forming Apparatus

Figure 2:
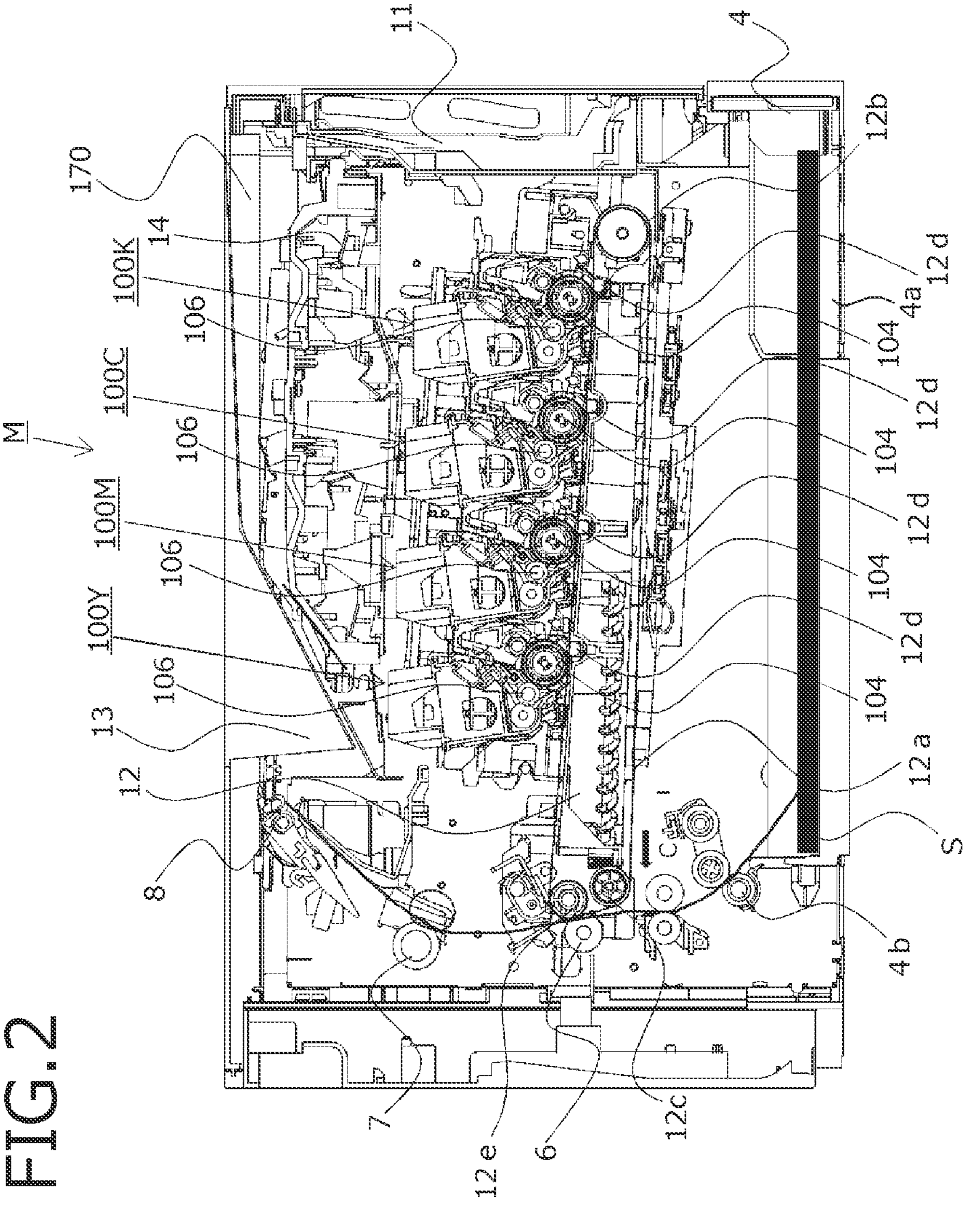
FIG. 2 is a cross-sectional view of an image forming apparatus.
Figure 3:
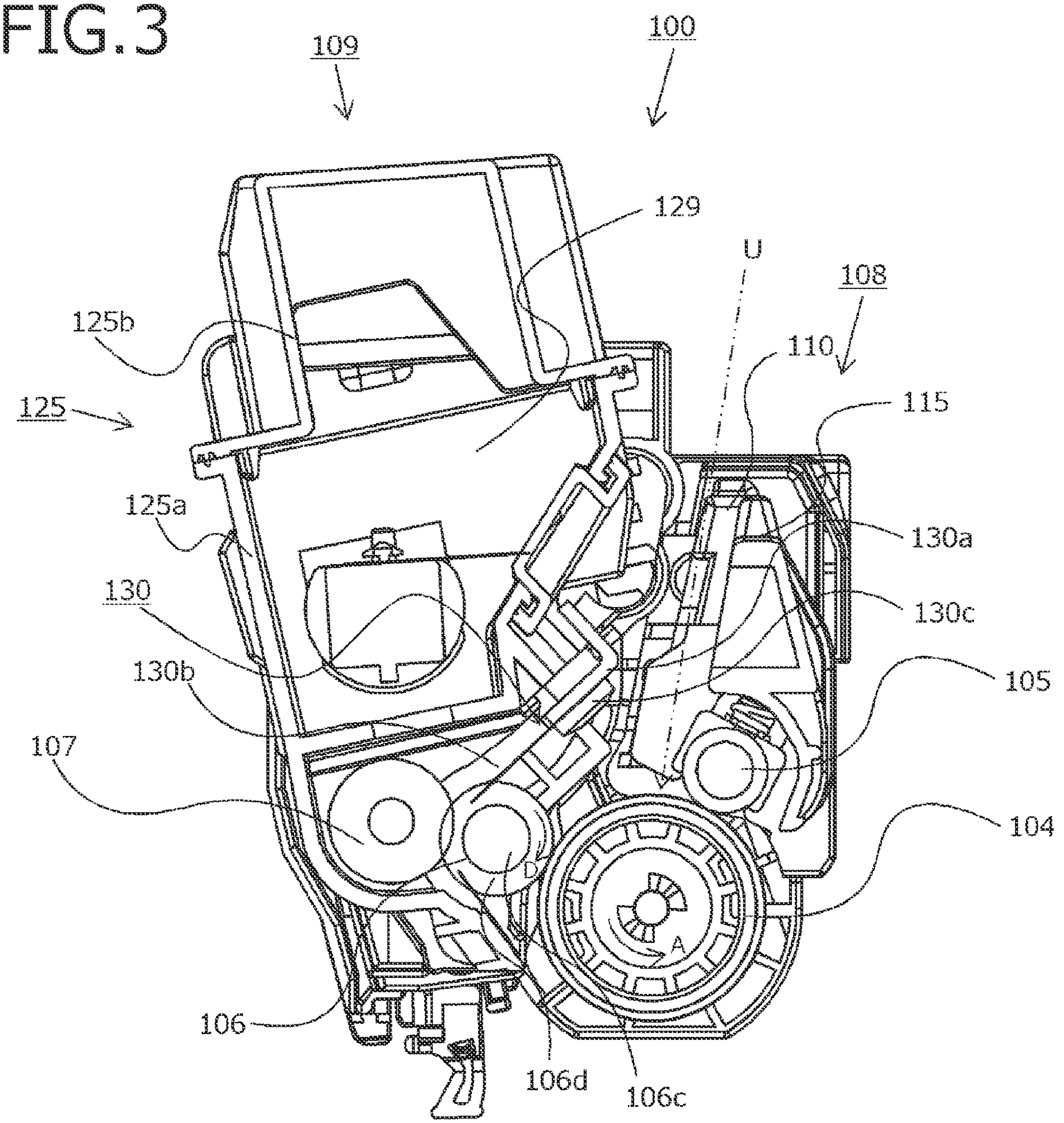
FIG. 3 is a cross-sectional view of a process cartridge.

FIG. 2 is a cross-sectional view schematically showing the configuration of an image forming apparatus M. Further, FIG. 3 is a cross-sectional view schematically showing the configuration of a process cartridge 100. This image forming apparatus M is a four-color full-color laser printer using an electrophotographic process, and forms a color image on a recording medium S. The image forming apparatus M is of a process cartridge type, in which the process cartridge 100 is detachably mounted on an image forming apparatus main body (apparatus main body) 170 to form a color image on a recording medium S.

Here, regarding the image forming apparatus M, the side on which a front door 11 is provided is the front surface (anterior surface), and the surface on the side opposite to the front surface is the back surface (rear surface). The right side of the image forming apparatus M as viewed from the front surface is called a gear side, and the left side thereof is called a non-gear side. Also, when the image forming apparatus M is viewed from the front surface, the upper side is the upper surface, and the lower side is the lower surface. FIG. 2 is a cross-sectional view of the image forming apparatus M as viewed from the non-gear side, the front side in the drawing is the non-gear side of the image forming apparatus M, the right side in the drawing is the front surface of the image forming apparatus M, and the back side in the drawing is the gear side of the image forming apparatus M.

Further, the gear side of the process cartridge 100 is the side on which a drum coupling member (photosensitive member coupling member), which will be described hereinbelow, is arranged with respect to the axial direction of the photosensitive drum (the axial direction of the rotation axis of the photosensitive drum). The gear side of the process cartridge 100 is the side on which a developing coupling member, which will be described hereinbelow, is arranged with respect to the axial direction of the developing roller (developing member) (the axial direction of the rotation axis of the developing roller). The axial direction of the photosensitive drum and the axial direction of the developing roller are parallel to each other, and the longitudinal direction of the process cartridge 100 (photosensitive drum, developing roller) is also parallel thereto.

In the image forming apparatus main body 170, first to fourth process cartridges 100 (100Y, 100M, 100C, 100K) are arranged substantially horizontally. Each of the first to fourth process cartridges 100 (100Y, 100M, 100C, 100K) has a similar electrophotographic process mechanism, and uses a different color developer (hereinafter referred to as toner). A rotational drive force is transmitted from a drive output unit (details of which will be described hereinbelow) of the apparatus main body 170 to the first to fourth process cartridges 100 (100Y, 100M, 100C, 100K). A bias voltage (charging bias, developing bias, and the like) is supplied (not shown) from the apparatus main body 170 to each of the first to fourth process cartridges 100 (100Y, 100M, 100C, 100K).

As shown in FIG. 3, each of the first to fourth process cartridges 100 (100Y, 100M, 100C, 100K) of the present embodiment has a drum unit 108 including a photosensitive drum 104 and a charging means acting as a process means on the photosensitive drum 104. Here, the drum unit 108 may have not only the charging means but also a cleaning means as the process means. Each of the first to fourth process cartridges 100 (100Y, 100M, 100C, 100K) has a developing unit 109 having a developing means for developing an electrostatic latent image on the photosensitive drum 104.

In each of the first to fourth process cartridges 100, the drum unit 108 and the developing unit 109 are coupled to each other, and the developing unit 109 is movably supported with respect to the drum unit 108. A more specific configuration of the process cartridge 100 will be described hereinbelow.

The first process cartridge 100Y accommodates a yellow (Y) toner in a developing frame 125 and forms a yellow toner image on the surface of the photosensitive drum 104. The second process cartridge 100M accommodates magenta (M) toner in the developing frame 125 and forms a magenta toner image on the surface of the photosensitive drum 104. The third process cartridge 100 C accommodates cyan (C) toner in the developing frame 125 and forms a cyan toner image on the surface of the photosensitive drum 104. The fourth process cartridge 100K accommodates black (K) toner in the developing frame 125 and forms a black toner image on the surface of the photosensitive drum 104.

A laser scanner unit 14 as an exposure means is provided above the first to fourth process cartridges 100 (100Y, 100M, 100C, 100K). This laser scanner unit 14 outputs a laser beam U correspondingly to image information. The laser beam U passes through an exposure window 110 of the process cartridge 100 and scans and exposes the surface of the photosensitive drum 104.

An intermediate transfer unit 12 as a transfer member is provided below the first to fourth process cartridges 100 (100Y, 100M, 100C, 100K). The intermediate transfer unit 12 has a drive roller 12*e*, a turn roller 12*c*, a tension roller 12*b*, and a flexible transfer belt 12*a* stretched thereon. The photosensitive drum 104 of each of the first to fourth process cartridges 100 (100Y, 100M, 100C, 100K) has a region on the lower side on the peripheral surface thereof that is in contact with a region of the outer peripheral surface of the annular transfer belt 12*a* that faces the upper surface. The contact portion is a primary transfer portion. A primary transfer roller 12*d* is provided to face the photosensitive drum 104 on the inside of the transfer belt 12*a*. A secondary transfer roller 6 is brought into contact with the turn roller 12*c* with the transfer belt 12*a* interposed therebetween. A contact portion between the transfer belt 12*a* and the secondary transfer roller 6 is a secondary transfer portion.

A feeding unit 4 is provided below the intermediate transfer unit 12. The feeding unit 4 has a paper feeding tray 4*a* on which recording media S are stacked and accommodated, and a paper feeding roller 4*b*. A transport path for the recording medium S is configured to extend substantially upward from the feeding unit 4 on the rear surface side of the apparatus inside the apparatus main body 170.

A fixing device 7 and a paper discharge device 8 are provided downstream of the secondary transfer portion in the transport path of the recording medium S (upper left side in the apparatus main body 170 in FIG. 2). The upper surface of the apparatus main body 170 is used as a paper discharge tray 13. The recording medium S is heated and pressurized by a fixing means provided in the fixing device 7 to fix the toner image and is discharged to the paper discharge tray 13.

Image Forming Operation

The operation for forming a full-color image is as follows. The photosensitive drums 104 of the first to fourth process cartridges 100 (100Y, 100M, 100C, 100K) are rotationally driven at a predetermined speed (in the direction of the arrow A in FIG. 3). The transfer belt 12*a* is also rotationally driven at a speed corresponding to the speed of the photosensitive drum 104 in the forward direction (direction of the arrow C in FIG. 2) as the photosensitive drum 104 rotates.

The laser scanner unit 14 is also driven. In synchronization with the driving of the laser scanner unit 14, the charging roller 105 in each process cartridge 100 uniformly charges the surface of the photosensitive drum 104 to a predetermined polarity and potential. The laser scanner unit 14 scans and exposes the surface of each photosensitive drum 104 with a laser beam U according to the image signal of each color. As a result, an electrostatic latent image corresponding to the image signal of the corresponding color is formed on the surface of each photosensitive drum 104. The formed electrostatic latent image is developed by a developing roller 106 that is rotationally driven at a predetermined speed. By such an electrophotographic image forming process operation, a yellow toner image corresponding to the yellow component of the full-color image is formed on the photosensitive drum 104 of the first process cartridge 100Y. Then, the toner image is primarily transferred onto the transfer belt 12*a*.

Similarly, a magenta toner image corresponding to the magenta component of the full-color image is formed on the photosensitive drum 104 of the second process cartridge 100M. Then, the toner image is primarily transferred with superposition on the yellow toner image that has already been transferred onto the transfer belt 12*a*. Similarly, a cyan toner image corresponding to the cyan component of the full-color image is formed on the photosensitive drum 104 of the third process cartridge 100C. Then, the toner image is primarily transferred with superposition on the yellow and magenta toner images that have already been transferred onto the transfer belt 12*a*. Similarly, a black toner image corresponding to the black component of the full-color image is formed on the photosensitive drum 104 of the fourth process cartridge 100K. Then, the toner image is primarily transferred with superposition on the yellow, magenta, and cyan toner images that have already been transferred onto the transfer belt 12*a*. In this manner, an unfixed full-color toner image of four colors of yellow, magenta, cyan, and black is formed on the transfer belt 12*a*.

Meanwhile, the recording medium S is separated and fed one by one at a predetermined control timing. The recording medium S is introduced to the secondary transfer portion, which is the contact portion between the secondary transfer roller 6 and the transfer belt 12*a*, at a predetermined control timing. As a result, the four-color superimposed toner image on the transfer belt 12*a* is sequentially transferred as a whole onto the surface of the recording medium S while the recording medium S is being transported to the secondary transfer portion. After that, the recording medium S is transported to the fixing device 7 to fix the toner image on the recording medium S, and then discharged to the paper discharge tray 13.

Cleaner-Less System

The image forming apparatus M according to the present embodiment adopts a so-called cleaner-less system in which the untransferred developer remaining on the image bearing member such as the photosensitive drum 104 or the transfer belt 12*a* after the transfer by the transfer means is collected by the developing means simultaneously with the development. That is, the configuration is used in which the developer remaining on the photosensitive drum 104 after the toner image (developer image) has been transferred to the transfer belt 12*a* is moved via the developing roller 106 to a frame accommodating the developer and collected. By adopting such a system, it is possible to provide a configuration in which a cleaning member for removing the untransferred toner, which has not been transferred and remained on the photosensitive drum 104, from the photosensitive drum 104 is not provided.

The untransferred toner remaining on the photosensitive drum 104 after the transfer step is negatively charged in the same manner as the photosensitive drum 104 by discharging in a space before the contact portion (charging nip) between the charging roller 105 and the photosensitive drum 104. The negatively charged untransferred toner passes through the charging roller 105 without adhering thereto due to the potential difference between the surface potential of the photosensitive drum and the potential of the charging roller at the charging nip. After passing through the charging nip, the untransferred toner reaches the irradiation position of the laser beam U. Since the amount of the untransferred toner is not large enough to block the laser beam U, the step of forming the electrostatic latent image on the photosensitive drum 104 is not affected. As for the toner that has passed through the laser irradiation position, the toner on the non-exposed portion (photosensitive drum surface that is not irradiated with the laser beam) at the contact portion (development nip) between the developing roller 106 and the photosensitive drum 104 is collected by an electrostatic force at the developing roller 106 and collected in the developing chamber or the like of the developing unit 109. The toner on the exposed portion (the surface of the photosensitive drum irradiated with the laser beam) is not electrostatically collected and remains as it is on the photosensitive drum 104. However, part of the toner may be collected by physical force created by the difference in circumferential speed between the developing roller 106 and the photosensitive drum 104. The toner remaining on the photosensitive drum 104 without being transferred onto the transfer belt 12*a* is generally collected in the developing chamber or the like of the developing unit 109. The collected toner is mixed for further use with the toner remaining in the developing chamber or the like.

Outline of Process Cartridge Attachment/Detachment Configuration

Figure 4:
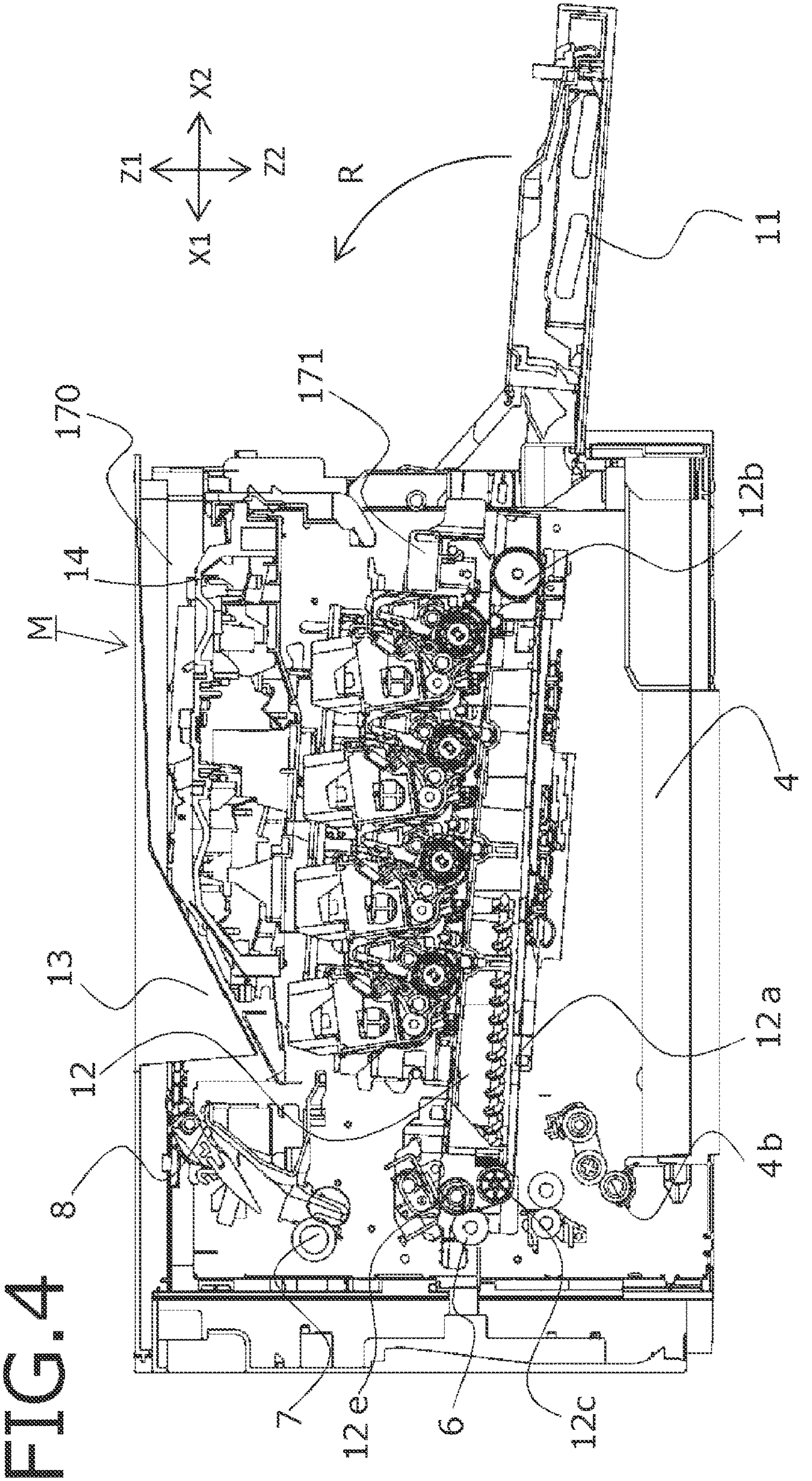
FIG. 4 is a cross-sectional view of the image forming apparatus.
Figure 5:
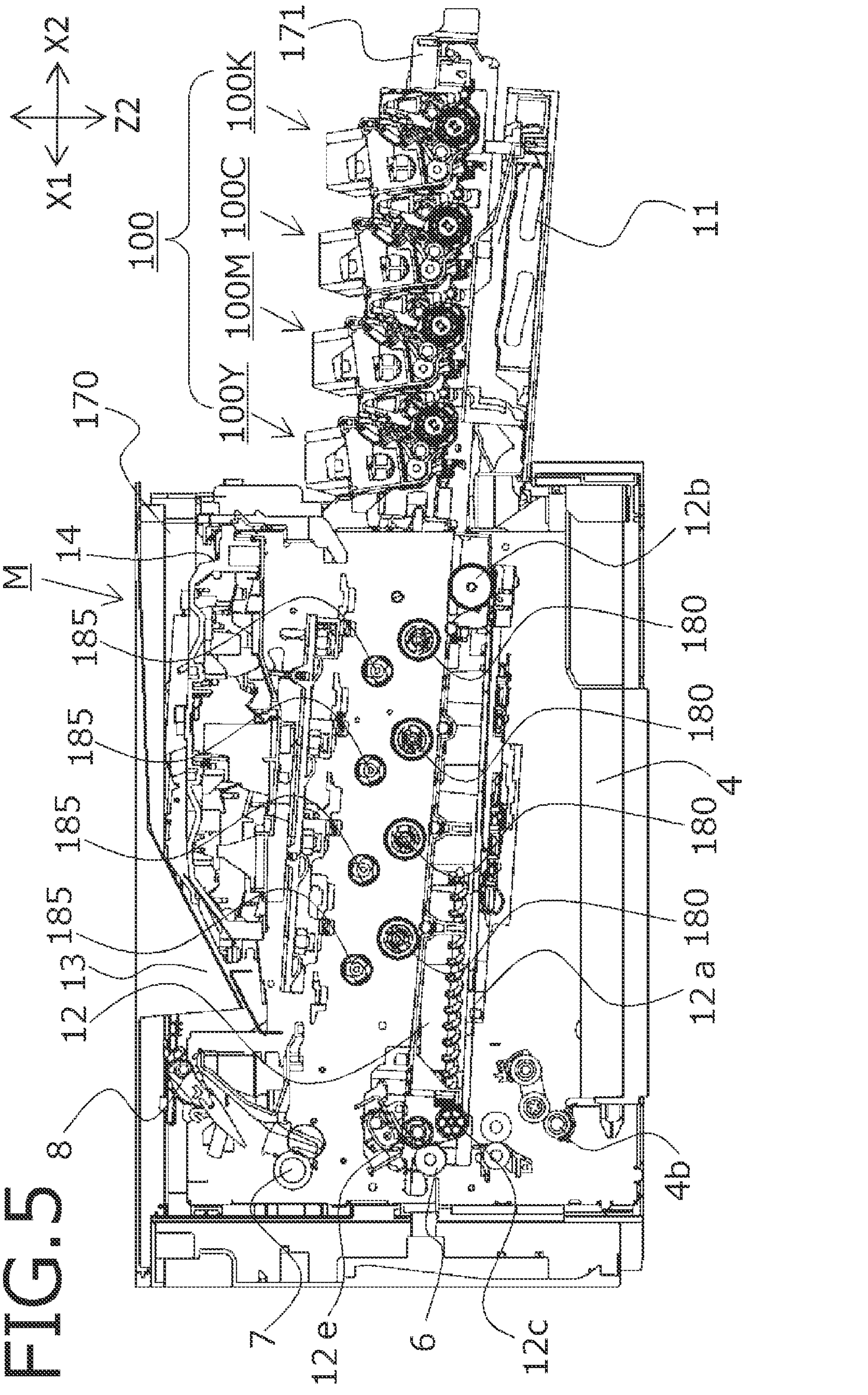
FIG. 5 is a cross-sectional view of the image forming apparatus.
Figure 6:
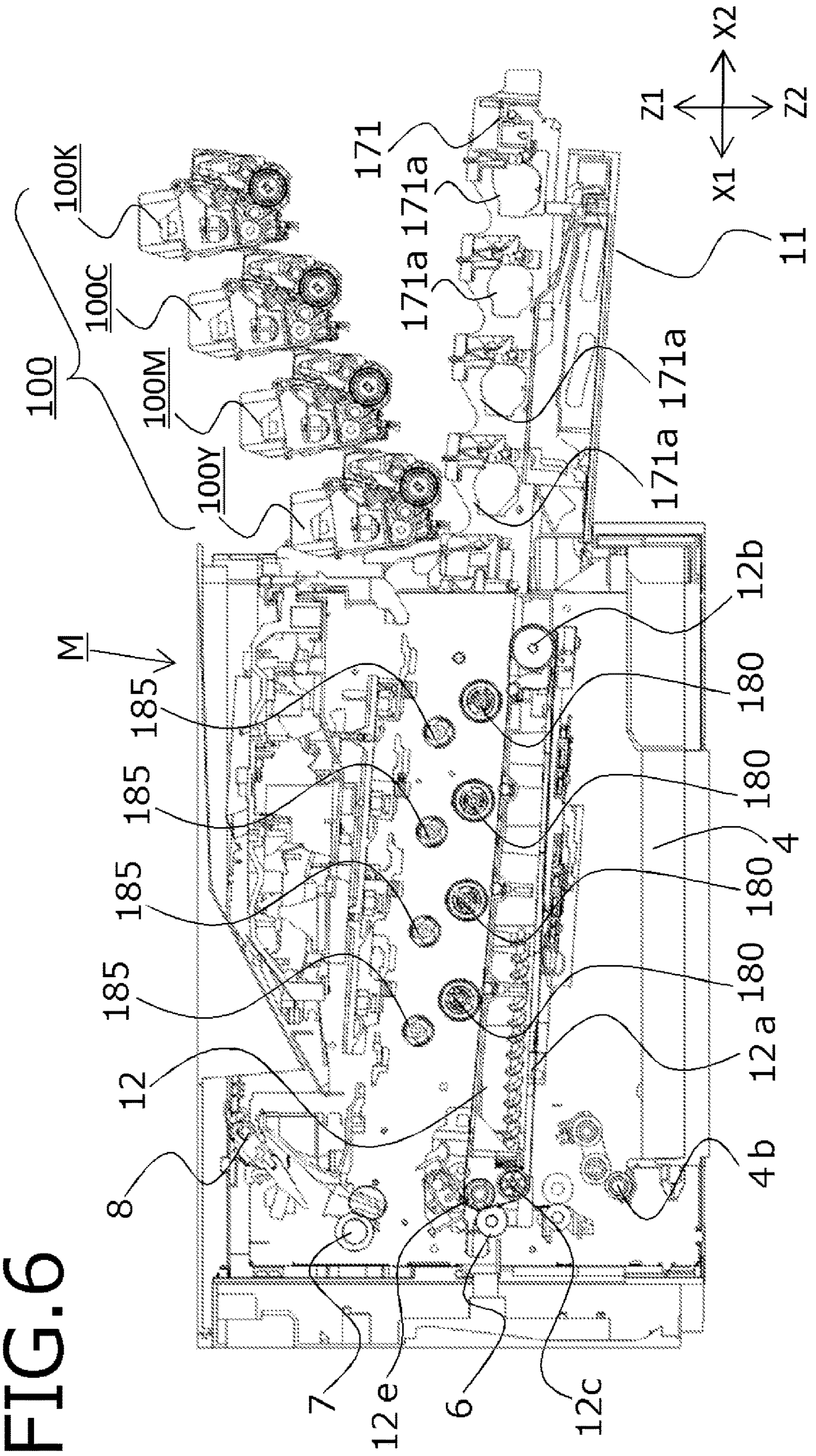
FIG. 6 is a cross-sectional view of the image forming apparatus.

A cartridge tray (hereinafter referred to as tray) 171 that supports the process cartridges will be described in more detail with reference to FIGS. 4 to 6. FIG. 4 is a cross-sectional view of the image forming apparatus M in which the front door 11 is open and the tray 171 is positioned inside the apparatus main body 170. FIG. 5 is a cross-sectional view of the image forming apparatus M in which the front door 11 is open, the tray 171 is positioned outside the apparatus main body 170, and the process cartridge 100 is accommodated inside the tray 171. FIG. 6 is a cross-sectional view of the image forming apparatus M in which the front door 11 is open, the tray 171 is positioned outside the apparatus main body 170, and the process cartridge 100 is removed from the tray 171.

As shown in FIGS. 4 and 5, the tray 171 can move in the direction of the arrow X1 (push-in direction) and the direction of the arrow X2 (pull-out direction), which are substantially horizontal directions (front and back directions of the apparatus) with respect to the apparatus main body 170. That is, the tray 171 is provided so that the tray can be pulled out from and pushed into the apparatus main body 170, and the tray 171 is configured to be movable in a substantially horizontal direction when the apparatus main body 170 is placed on a horizontal plane. Here, the state in which the tray 171 is positioned outside the apparatus main body 170 (the state in FIG. 5) is referred to as an outer position. Further, a state in which the tray 171 is positioned inside the apparatus main body 170 with the front door 11 open and the photosensitive drum 104 and the transfer belt 12*a* are separated from each other (state shown in FIG. 4) is referred to as an inner position.

In addition, the tray 171 has a mounting portion 171*a* enabling detachable mounting of the process cartridge 100 as shown in FIG. 6 in the outer position. The process cartridge 100 is moved inside the apparatus main body 170 as the tray 171 is moved while being arranged at the mounting portion 171*a*. At this time, the movement takes place in a state where a gap is present between the transfer belt 12*a* and the photosensitive drum 104. Therefore, the tray 171 can move the process cartridge 100 inside the apparatus main body 170 without the photosensitive drum 104 coming into contact with the transfer belt 12*a*.

In the present embodiment, where the front door 11 is closed, the intermediate transfer unit 12 is raised in the direction of the arrow Z1 (upward) by a link mechanism (not shown) and moves to a position at the time of image formation (position at which the photosensitive drum 104 and the intermediate transfer belt 12*a* are in contact with each other). Further, where the front door 11 is opened, the intermediate transfer unit 12 descends in the direction of the arrow Z2 (downward), and the photosensitive drum 104 and the intermediate transfer belt 12*a* are separated from each other. Therefore, the tray 171 can move the process cartridge 100 inside the apparatus main body 170 without the photosensitive drum 104 coming into contact with the transfer belt 12*a*.

As described above, by using the tray 171, the plurality of process cartridges 100 can be collectively moved to positions inside the apparatus main body 170 where image formation is possible and can be collectively pulled out to the outside of the apparatus main body 170.

Overall Configuration of Process Cartridge

Figure 7:
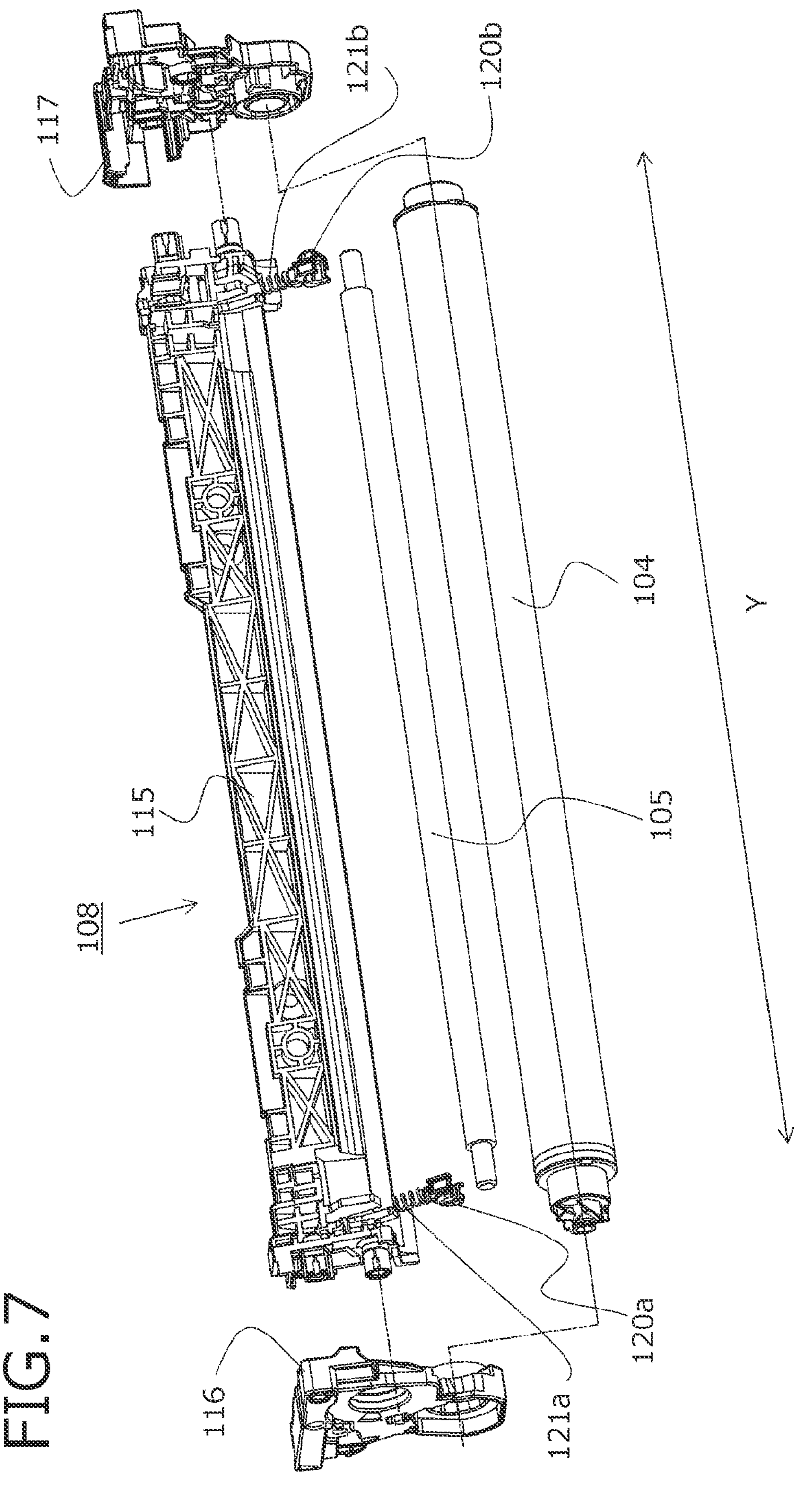
FIG. 7 is an exploded perspective view of a drum unit.
Figure 8:
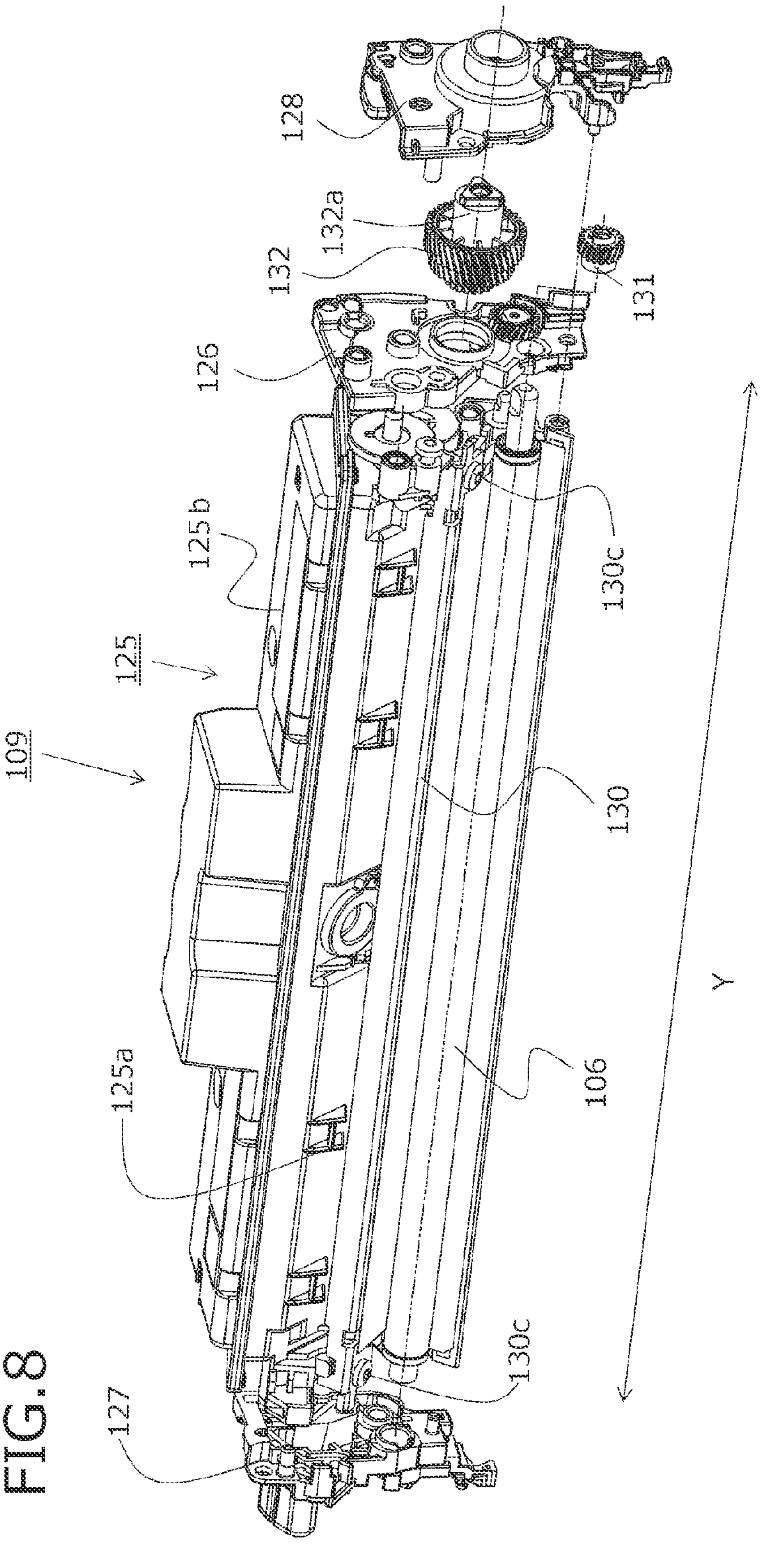
FIG. 8 is an exploded perspective view of a developing unit.
Figure 9:
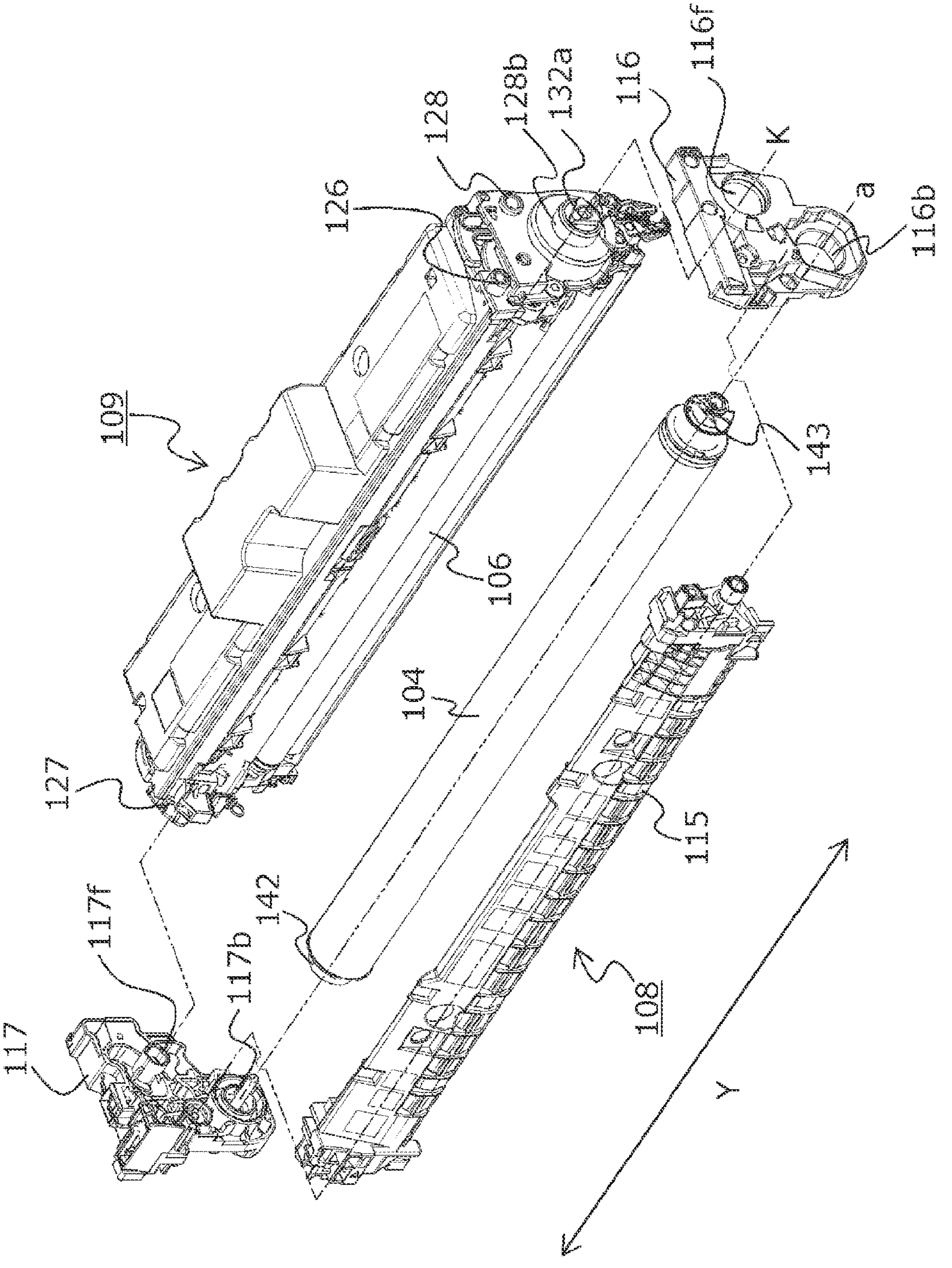
FIG. 9 is an assembly perspective view of the process cartridge.
Figure 10:
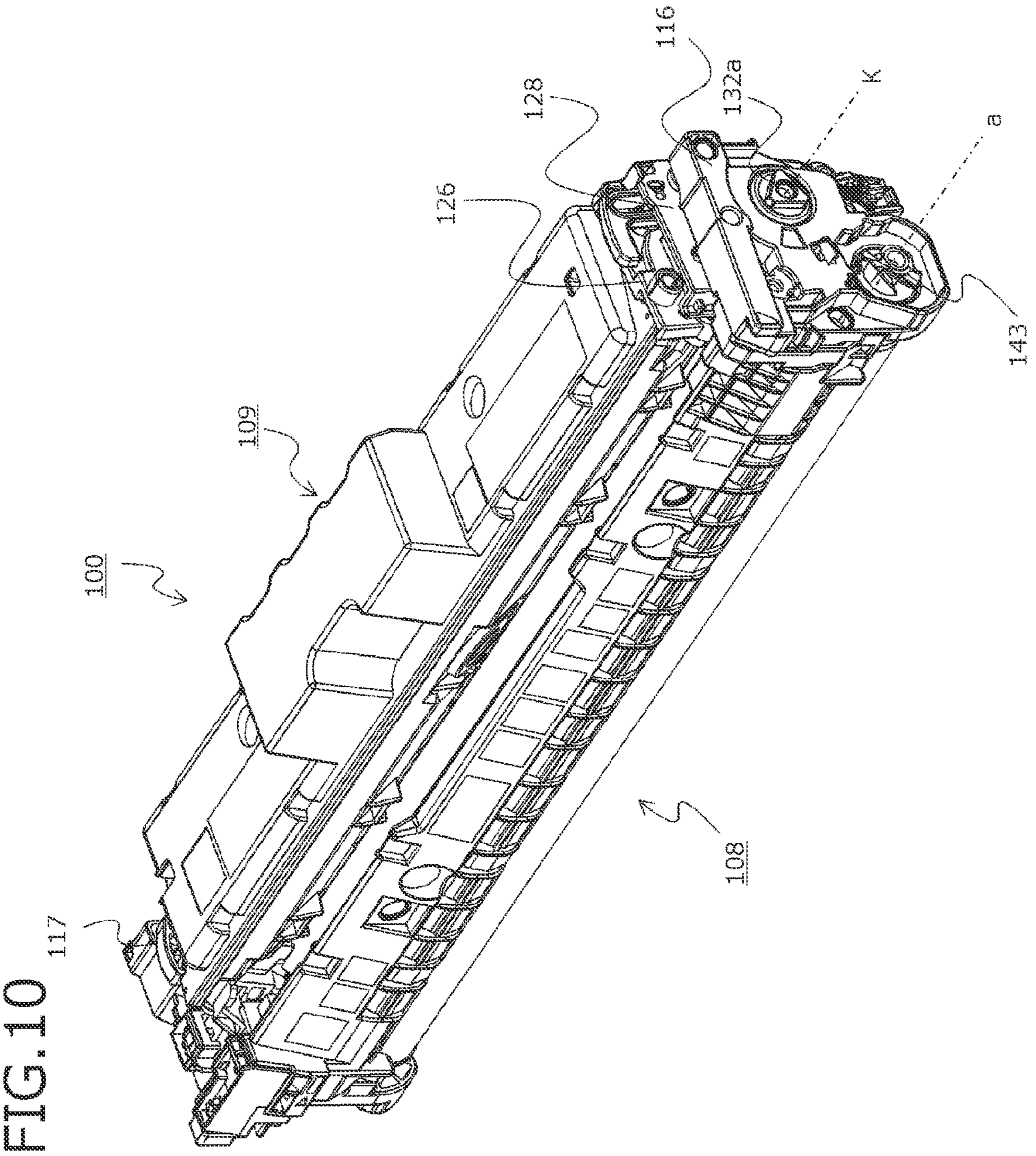
FIG. 10 is a perspective view of the process cartridge.

The configuration of the process cartridge will be described with reference to FIGS. 7 to 10. FIG. 7 is an exploded perspective view of the drum unit 108 showing the disassembled constituent members of the drum unit 108. FIG. 8 is an exploded perspective view of the developing unit 109. FIG. 9 is an assembly perspective view of the process cartridge 100 showing the disassembled constituent members of the process cartridge 100 when the process cartridge 100 is viewed from the gear side, which is one end side of the photosensitive drum 104 in the axial direction. FIG. 10 is a perspective view of the process cartridge 100 viewed from the gear side.

In the present embodiment, the first to fourth process cartridges 100 (100Y, 100M, 100C, and 100K) have similar electrophotographic process mechanisms and may differ in the color of the toner accommodated therein, the amount of toner filled, and the control performed by the apparatus main body 170. However, although these four process cartridges may have different dimensions, they have the same basic structure and functions. Therefore, one process cartridge 100 will be described hereinbelow as a representative cartridge.

The process cartridge 100 includes photosensitive drums 104 (104Y, 104M, 104C, 104K) and a process means acting on the photosensitive drums 104. Here, the process means includes the charging roller 105 as a charging means (charging member) for charging the photosensitive drum 104, a developing roller 106 as a developing means (developing member) for developing a latent image formed on the photosensitive drum 104, and the like. The process cartridge

100 is divided into drum units 108 (108Y, 108M, 108C, 108K) and developing units 109 (109Y, 109M, 109C, 109K).

In the following description, the longitudinal direction Y of the drum unit 108 and the developing unit 109 is a direction substantially parallel to the rotation axis a of the photosensitive drum 104 (FIG. 9).

Configuration of Drum Unit

As shown in FIGS. 7 and 9, the drum unit 108 is configured of the photosensitive drum 104, the charging roller 105, and a drum frame 115. The charging roller 105 is rotatably supported by a gear-side charging roller bearing 120*a* and a non-gear-side charging roller bearing 120*b* and is biased against the photosensitive drum 104 by pressure springs 121*a* and 121*b*. The photosensitive drum 104 is rotatably supported by a gear-side cartridge cover member 116 and a non-gear-side cartridge cover member 117 provided at both ends in the longitudinal direction of the process cartridge 100. The gear-side cartridge cover member 116 serving as a second end supporting portion supports one end portion (second end portion) of the two longitudinal end portions of the photosensitive drum 104. The non-gear side cartridge cover member 117 serving as a first end supporting portion supports the other end portion (first end portion) of the two longitudinal end portions of the photosensitive drum 104.

As shown in FIG. 9, a coupling member 143 for transmitting a driving force to the photosensitive drum 104 is provided at one end side in the longitudinal direction of the photosensitive drum 104. The coupling member 143 is engaged with a main body-side drum drive coupling 180 (FIGS. 5 and 6) serving as a drum drive output portion of the apparatus main body 170, and the driving force of a drive motor (not shown) of the apparatus main body 170 is transmitted to the photosensitive drum 104 to rotate the photosensitive drum in the direction of the arrow A (FIG. 3). Further, the photosensitive drum 104 has a drum flange 142 on the other longitudinal end side. The charging roller 105 is supported by the drum frame 115 so as to be in contact with the photosensitive drum 104 and be rotated.

Configuration of Developing Unit

As shown in FIGS. 3 and 8, the developing unit 109 is configured of the developing roller 106, a toner transport roller 107, a developing blade 130, the developing frame 125, and the like. The developing frame 125 is configured of a lower frame 125*a* and a lid member 125*b*. The lower frame 125*a* and the lid member 125*b* are joined by ultrasonic welding or the like. The developing frame 125 has a toner storage section 129 that stores toner to be supplied to the developing roller 106. Further, the developing frame 125 rotatably supports the developing roller 106 and the toner transport roller 107 by a gear-side bearing 126 and a non-gear-side bearing 127 and holds the developing blade 130 that regulates the thickness of the toner layer on the peripheral surface of the developing roller 106.

In the developing blade 130, an elastic member 130*b*, which is a sheet-shaped metal having a thickness of about 0.1 mm, is attached by welding or the like to a supporting member 130*a*, which is a metal material having an L-shaped cross section. The developing blade 130 is attached to the developing frame 125 with fixing screws 130*c* at two locations, one end and the other end in the longitudinal direction. The developing roller 106 is configured of a core 106*c* made of a metal material and a rubber portion 106*d*.

The developing roller 106 is rotatably supported by the gear-side bearing 126 and the non-gear-side bearing 127 attached to both ends in the longitudinal direction of the developing frame 125. The non-gear-side bearing 127 is fastened to the lower frame 125*a* of the developing frame 125 with a screw 307 (see FIG. 13). A development drive input gear 132 for transmitting a drive force to the developing unit 109 is provided at one end (gear side) of the developing unit 109 in the longitudinal direction. The development drive input gear 132 is provided with a development input coupling portion 132*a* that receives drive from a main body-side development drive coupling 185 (FIGS. 5 and 6) of the apparatus main body 170, and inputs the drive force of a drive motor (not shown) of the apparatus main body 170 to the developing unit 109.

The driving force input to the developing unit 109 is transmitted to the developing roller gear 131, thereby making it possible to rotate the developing roller 106 in the direction of the arrow D in FIG. 3. A development cover member 128 that supports and covers the development drive input gear 132 is provided at one longitudinal end side (gear side) of the developing unit 109. The development cover member 128 is fastened together with the gear-side bearing 126 to the lower frame 125*a* of the developing frame 125 with a screw 308 (see FIG. 11). The outer diameter of the developing roller 106 is set smaller than the outer diameter of the photosensitive drum 104. The outer diameter of the photosensitive drum 104 of the present embodiment is set within the range of Φ18 to Φ22, and the outer diameter of the developing roller 106 is set within the range of Φ8 to Φ14. Efficient arrangement becomes possible by setting such outer diameters.

Assembly of Drum Unit and Developing Unit

The assembly of the drum unit 108 and the developing unit 109 will be described with reference to FIG. 9. The drum unit 108 and the developing unit 109 are coupled together by the gear-side cartridge cover member 116 and the non-gear side cartridge cover member 117 provided at both ends in the longitudinal direction of the process cartridge 100.

The gear-side cartridge cover member 116 provided at one end side in the longitudinal direction of the process cartridge 100 is provided with a developing unit supporting hole 116*f* for swingably (movably) supporting the developing unit 109. Similarly, the non-gear-side cartridge cover member 117 provided at the other end side in the longitudinal direction of the process cartridge 100 is provided with a developing unit supporting hole 117*f* for swingably supporting the developing unit 109. Further, the gear-side cartridge cover member 116 and the non-gear-side cartridge cover member 117 are provided with respective drum support holes 116*b* and 117*b* for rotatably supporting the photosensitive drum 104.

Here, at one end side in the longitudinal direction of the process cartridge 100, the outer diameter portion of a cylindrical portion 128*b* of the development cover member 128 of the developing unit 109 is fitted into the developing unit supporting hole 116*f* of the gear-side cartridge cover member 116. At the other end side in the longitudinal direction of the process cartridge 100, the outer diameter portion of a cylindrical portion (not shown) of the non-gear-side bearing 127 of the developing unit 109 is fitted into the developing unit supporting hole 117*f* of the non-gear-side cartridge cover member 117. Further, the end sides in the longitudinal direction of the photosensitive drum 104 are fitted into the drum supporting hole 116*b* of the gear-side cartridge cover member 116 and the drum supporting hole 117*b* of the non-gear-side cartridge cover member 117, respectively. The gear-side cartridge cover member 116 and the non-gear-side cartridge cover member 117 are fixed to the drum unit 108 by screws, adhesive, or the like (not shown).

That is, the developing unit 109 is swingably supported by the developing unit supporting hole 116*f* and the developing unit supporting hole 117*f* with respect to the gear-side cartridge cover member 116 and the non-gear-side cartridge cover member 117. Meanwhile, the drum unit 108 is fixed with respect to the gear-side cartridge cover member 116 and the non-gear-side cartridge cover member 117. That is, the developing unit 109 can rotate with respect to the drum unit 108 (photosensitive drum 104) by rotating with respect to the gear-side cartridge cover member 116 and the non-gear-side cartridge cover member 117. In this manner, the process cartridge 100 is configured such that the relative positions of the developing unit 109 and the drum unit 108 can be changed by swinging the developing unit 109 with respect to the gear-side cartridge cover member 116 and the non-gear-side cartridge cover member 117. As a result, the developing roller 106 can be positioned to act on the photosensitive drum 104 at the time of image formation.

FIG. 10 shows a state in which the drum unit 108 and the developing unit 109 are assembled and integrated as the process cartridge 100 through the above steps. An axis connecting the center of the developing unit supporting hole 116*f* of the gear-side cartridge cover member 116 and the center of the developing unit supporting hole 117*f* of the non-gear-side cartridge cover member 117 is defined as a swing axis (rotation axis, rotation center) K. Here, the cylindrical portion 128*b* of the development cover member 128 on one end side in the longitudinal direction of the process cartridge 100 is coaxial with the development input coupling portion 132*a*. That is, the developing unit 109 is configured such that the driving force is transmitted from the apparatus main body 170 at this swing axis K. Further, the developing unit 109 is rotatably supported with respect to the process cartridge 100 about the swing axis K.

Explanation of the Separation-Contact Mechanism

A configuration in which the photosensitive drum 104 of the drum unit 108 and the developing roller 106 of the developing unit 109 in the present embodiment are separated from each other and brought into contact with each other will be described with reference to FIGS. 11, 12 and 13.

The process cartridge 100 has a separation-contact mechanism on the gear side and the non-gear side. FIG. 11 is an assembly perspective view showing the gear-side configuration of the process cartridge 100 including the separation-contact mechanism on the gear side. FIG. 12 is a side view of the process cartridge 100, as seen from the gear side, after a limiting member 151R, which will be described hereinbelow, is assembled. FIG. 13 is an assembly perspective view showing the disassembled non-gear-side configuration of the process cartridge 100 including the separation-contact mechanism on the non-gear side. The separation-contact mechanism has substantially the same function on the gear side and the non-gear side. R is added to the numerals of the members constituting the gear-side separation-contact mechanism. The reference numerals of the members constituting the non-gear-side separation-contact mechanism are the same as those on the gear side with the addition of L.

Figure 11:
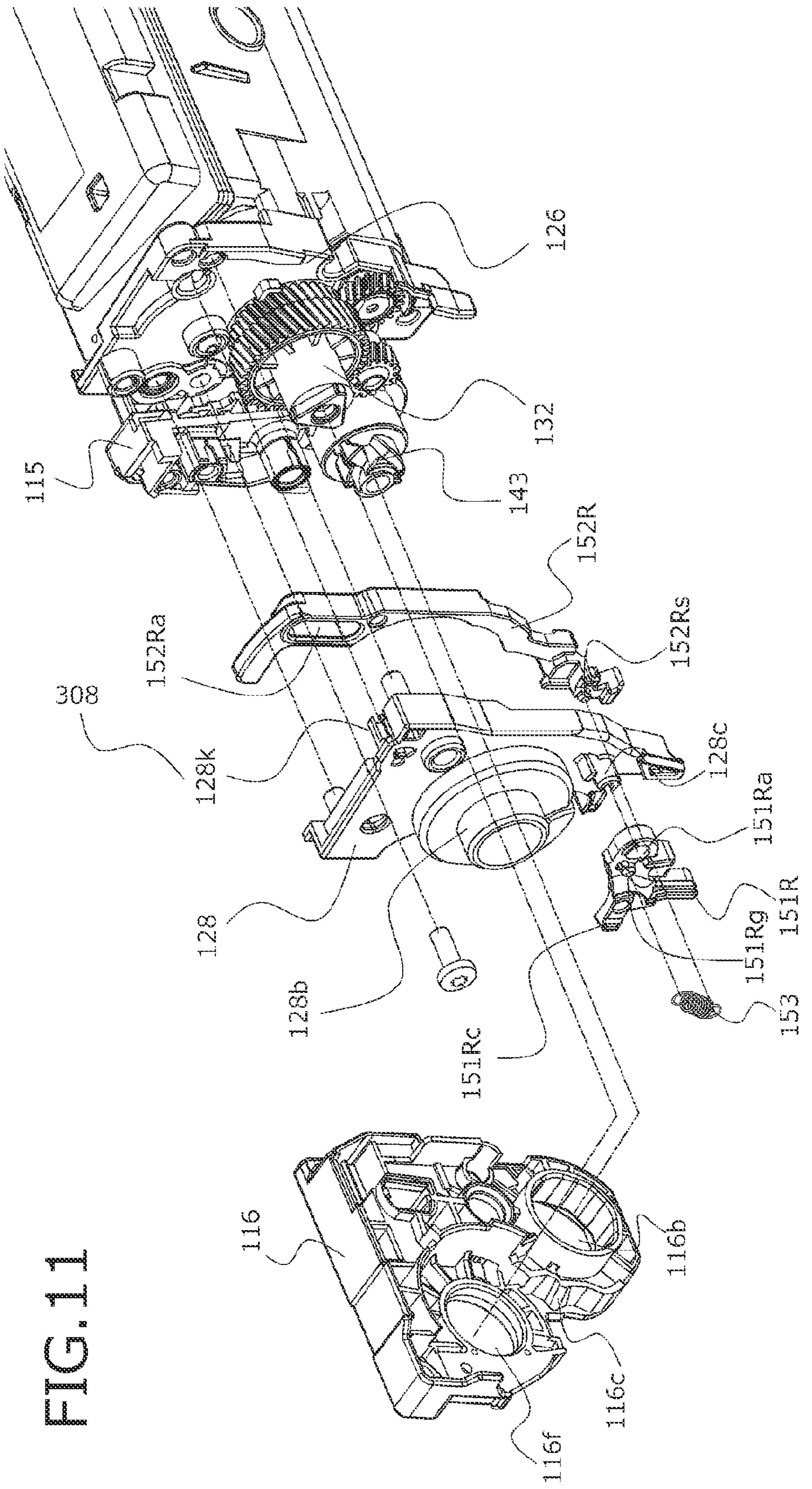
FIG. 11 is an assembly perspective view of a gear side including a separation-contact mechanism on the gear side.
Figure 12:
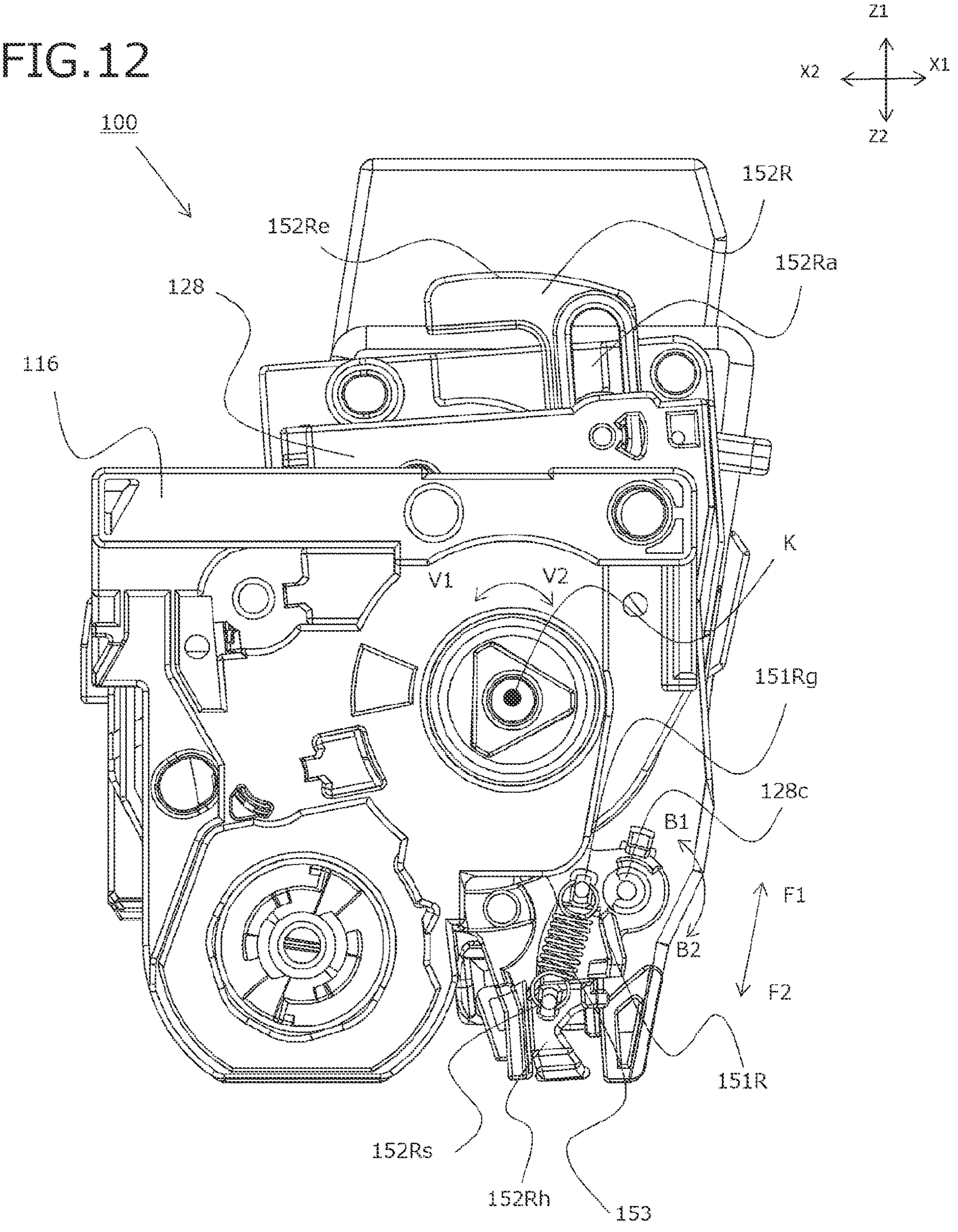
FIG. 12 is a side view of the process cartridge after assembly of a limiting member as viewed from the gear side.
Figure 13:
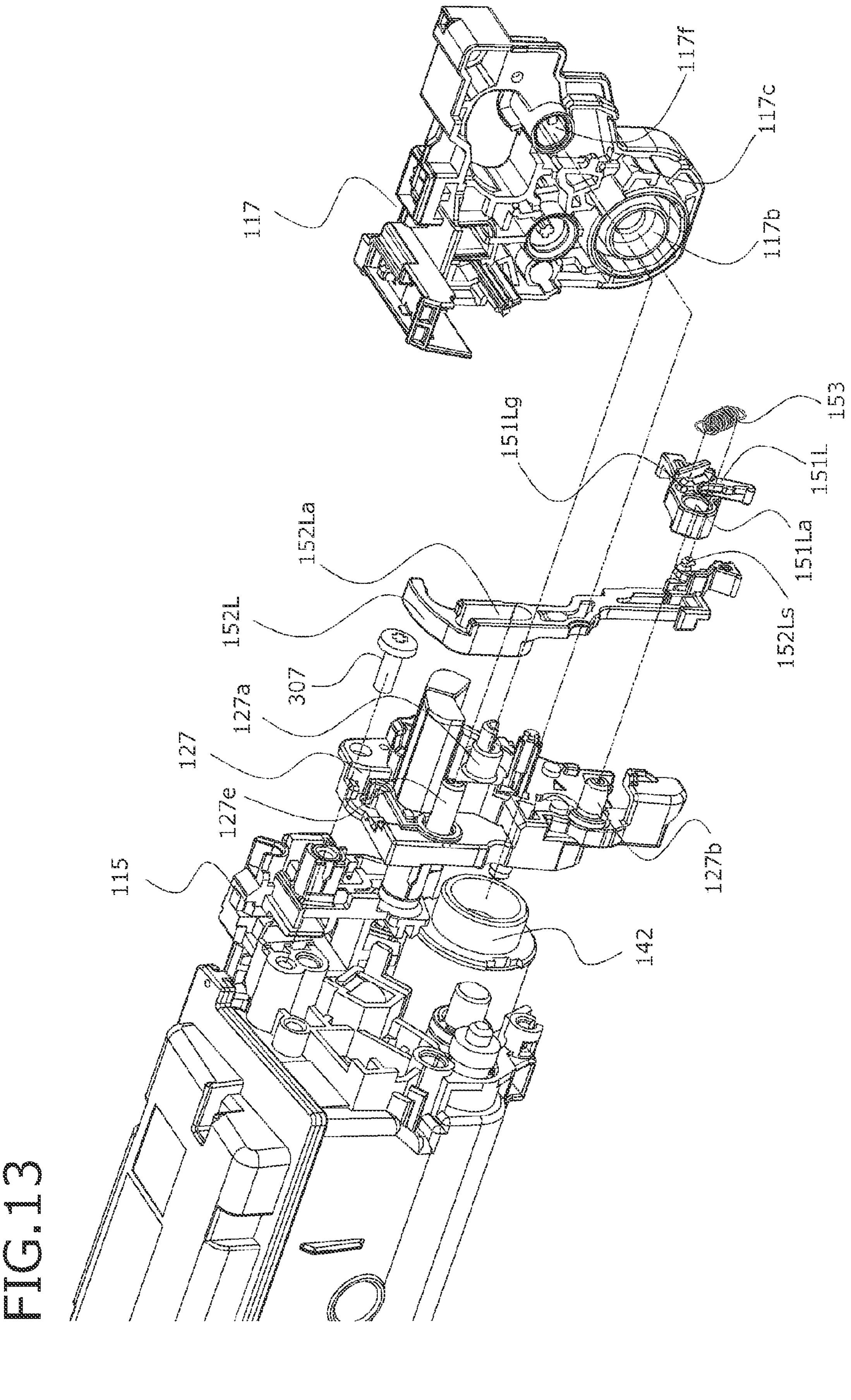
FIG. 13 is an assembly perspective view of a non-gear side including a separation-contact mechanism on the non-gear side.

As shown in FIGS. 11 and 12, the gear-side separation-contact mechanism has the limiting member 151R, a moving member 152R, and a tension spring 153. The development cover member 128 is provided with a supporting portion 128*c* that supports the limiting member 151R and a supporting portion 128*k* that supports the moving member 152R. The limiting member 151R has a supported portion 151Ra that is a hole, and the supporting portion 128*c* is fitted into the supported portion 151Ra. The limiting member 151R can be rotated with respect to the development cover member 128 about the supporting portion 128*c* by rotating the supported portion 151Ra with respect to the supporting portion 128*c*. The moving member 152R has a supported portion 152Ra that is an elongated hole, and the supporting portion 128*k* is fitted into the supported portion 152Ra. As a result of the supported portion 152Ra rotating with respect to the supporting portion 128*k* or moving relative to the supporting portion 128*k* in the longitudinal direction of the elongated hole, the moving member 152R can rotate with respect to the development cover member 128 around the supporting portion 128*k* or move in the elongated hole direction.

The separation-contact mechanism includes the tension spring 153 that urges the limiting member 151R to rotate in the direction of the arrow B1 in FIG. 12 around the supporting portion 128*c* and also urges the moving member 152R in the direction of the arrow Z1. The tension spring 153 is a coil spring and is an elastic member. The tension spring 153 is assembled by engaging with a spring hooking portion 151Rg provided on the limiting member 151R and a spring hooking portion 152Rs provided on the moving member 152R. The tension spring 153 applies a force in the direction of the arrow F2 in FIG. 12 to the spring hooking portion 151Rg of the limiting member 151R, thereby applying a biasing force to rotate the limiting member 151R in the direction of the arrow B1. Further, the tension spring 153 applies a force in the direction of the arrow F1 to the spring hooking portion 152Rs of the moving member 152R, thereby applying a biasing force to move the moving member 152R in the direction of the arrow Z1.

A non-gear-side separation-contact mechanism will be described with reference to FIG. 13. As shown in FIG. 13, the non-gear-side separation-contact mechanism has a limiting member 151L, a moving member 152L, and the tension spring 153. The non-gear-side bearing 127 is provided with a supporting portion 127*b* that supports the limiting member 151L and a supporting portion 127*e* that supports the moving member 152L. The limiting member 151L has a supported portion 151La that is a hole, and the supporting portion 127*b* is fitted into the supported portion 151La. The limiting member 151L can be rotated with respect to the non-gear-side bearing 127 about the supporting portion 127*b* by rotating the supported portion 151La with respect to the supporting portion 127*b*. The moving member 152L has a supporting portion 152La that is an elongated hole, and the supporting portion 127*e* is fitted into the supported portion 152La. As a result of the supported portion 152La rotating with respect to the supporting portion 127*e* or moving relative to the supporting portion 127*e* in the longitudinal direction of the elongated hole, the moving member 152L can rotate with respect to the non-gear-side bearing 127 around the supporting portion 127*e* or move in the elongated hole direction.

The tension spring 153 is assembled by engaging with a spring hooking portion 151Lg provided on the limiting member 151L and a spring hooking portion 152Ls provided on the moving member 152L. The function of the tension spring 153 on the non-gear side is the same as that of the tension spring 153 on the gear side, so the description thereof will be omitted.

Explanation of Separated State and Contact State of Process Cartridge

Figure 14A:
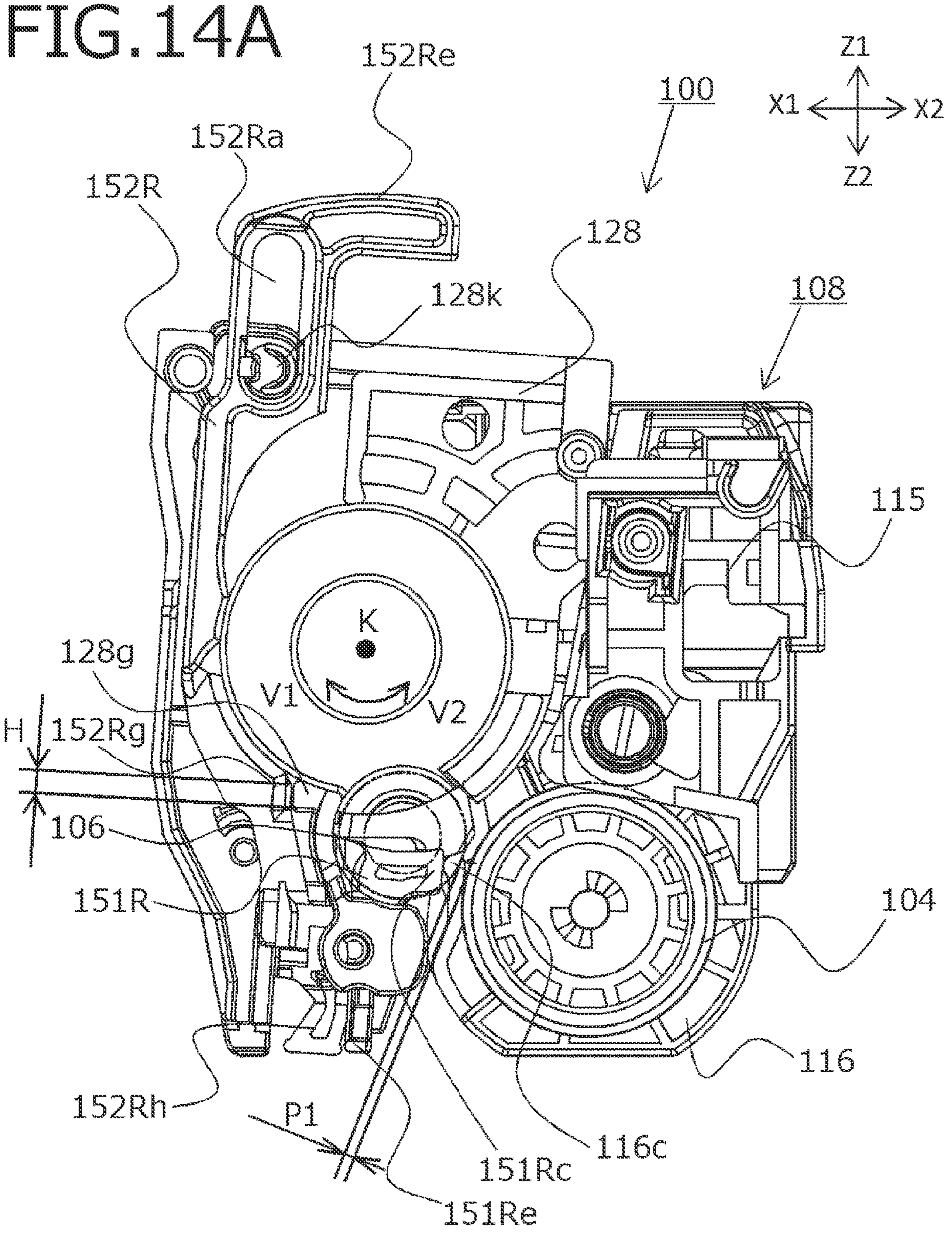
FIG. 14A is a side view showing the separating operation and the contacting operation of the process cartridge.
Figure 14B:
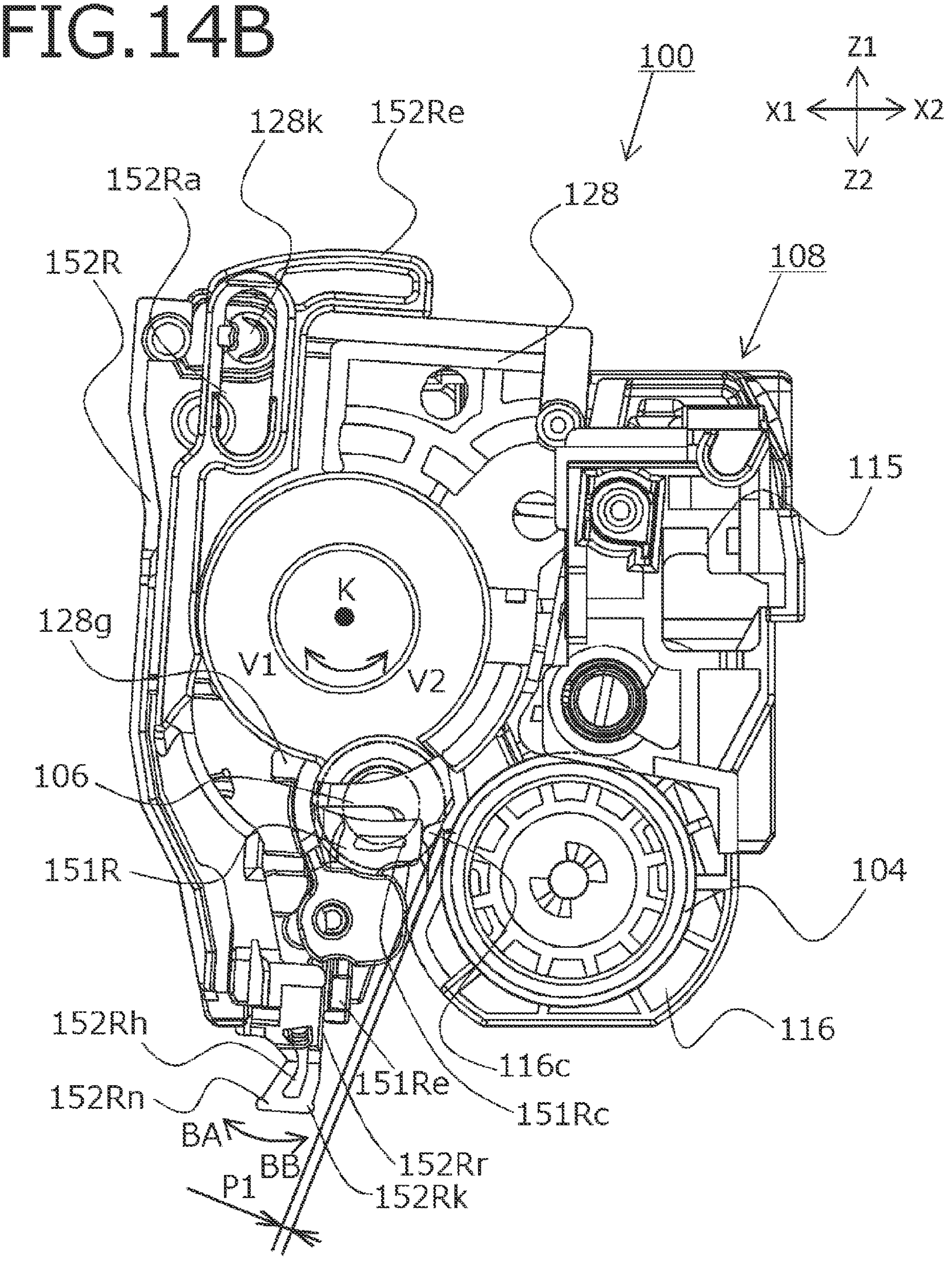
FIG. 14B is a side view showing the separating operation and the contacting operation of the process cartridge.
Figure 14C:
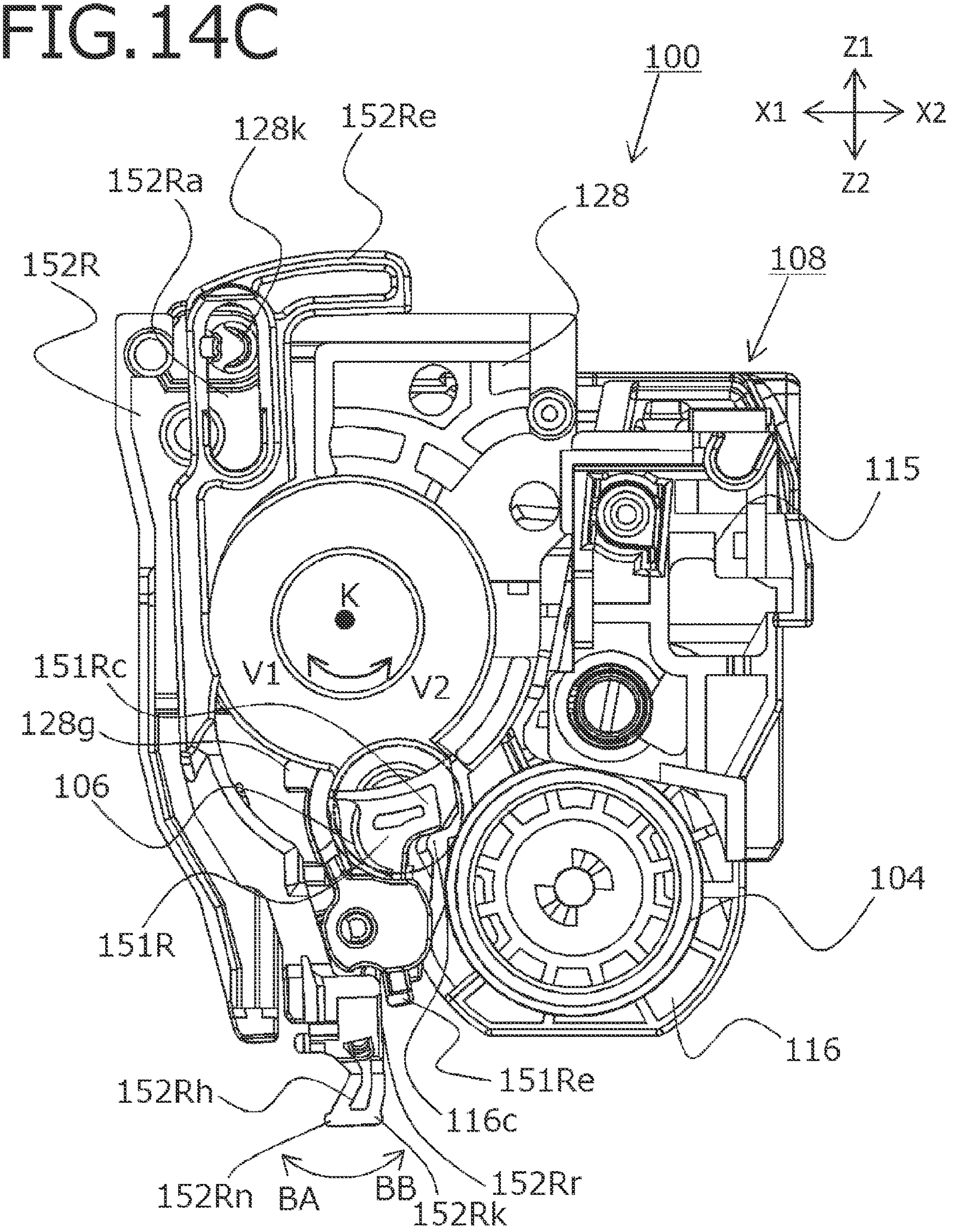
FIG. 14C is a side view showing the separating operation and the contacting operation of the process cartridge.
Figure 15:
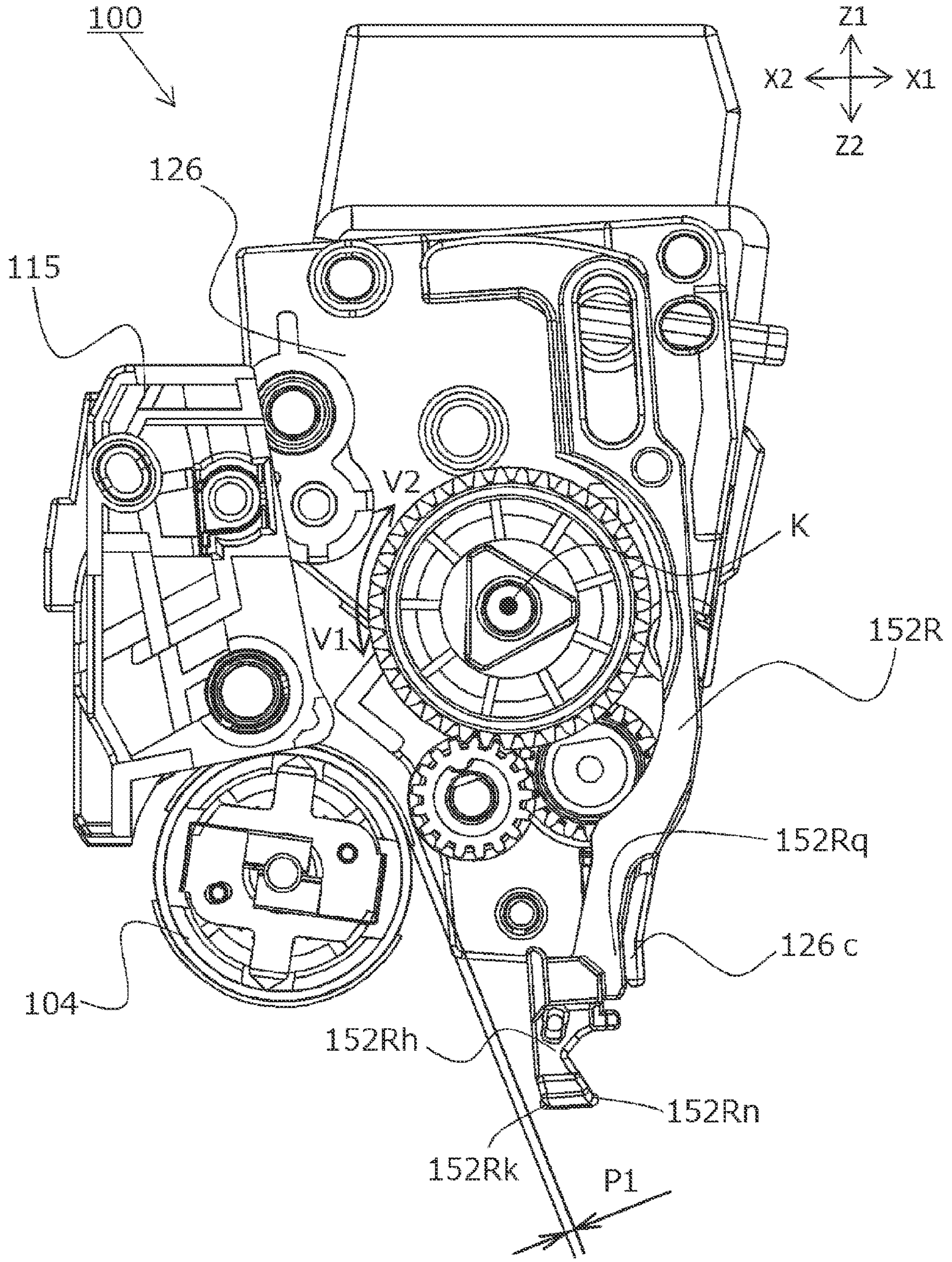
FIG. 15 is a side view of the process cartridge.

The separated state and contact state of the process cartridge 100 will be described with reference to FIGS. 12, 14A to 14C, and 15. FIGS. 14A to 14C show only the photosensitive drum 104, the drum frame 115, the gear-side cartridge cover member 116, the development cover member 128, the limiting member 151R, and the moving member 152R. FIG. 14A shows a state in which the developing unit 109 is separated from the photosensitive drum 104. FIG. 14B shows a state when the moving member 152R moves in the direction Z2. FIG. 14C shows a state in which the developing unit 109 is in contact with the photosensitive drum 104. FIG. 15 is a side view of the gear side excluding the gear-side cartridge cover member 116, the development cover member 128, the moving member 152R and the tension spring 153. Since the separation-contact mechanisms on the gear side and the non-gear side have the same configuration, the explanation will be made using the gear side.

First, the state in which the developing unit 109 is at the separation position will be described. In this state, a contact portion 151Rc of the limiting member 151R contacts the contacted portion 116*c* of the gear-side cartridge cover member 116. Further, the developing unit 109 is pressed toward the photosensitive drum 104 by the action of a development pressure spring (not shown) provided on the non-gear side. At this time, the contact portion 151Rc of the limiting member 151R is pressed toward the contacted portion 116*c* of the gear-side cartridge cover member 116. For this reason, the gear-side cartridge cover member 116 positions the development cover member 128 through the limiting member 151R (interposed therebetween) so as to maintain a state in which the developing roller 106 is separated from the photosensitive drum 104 against the biasing force of a development pressure spring (not shown). That is, the drum unit 108 positions and holds the developing unit 109 through the limiting member 151R. At this time, the photosensitive drum 104 and the developing roller 106 are separated by a gap P1. This state is defined as a separation position (first position) (the state shown in FIGS. 12 and 14A).

From this state, a pushed portion 152Re of the moving member 152R is pushed in the direction Z2. As a result, a protruding portion 152Rh of the moving member 152R moves to the protruding position where it protrudes from the developing frame 125. When a second force receiving portion 152Rn is pressed in the direction of the arrow X2, the moving member 152R rotates in the direction of the arrow BB around the supporting portion 128*k*. A limiting member pressing surface 152Rr of the moving member 152R presses a limited portion 151Re of the moving member 151R, thereby rotating the limiting member 151R in the direction of the arrow B2 in FIG. 12. Where the limiting member 151R rotates in the direction of the arrow B2, the contact portion 151Rc separates from the contacted portion 116*c* of the gear-side cartridge cover member 116, and the developing unit 109 can rotate in the direction of the arrow V2 about the swing axis K from the separation position. That is, the developing unit 109 rotates in the direction V2 from the separation position, and the developing roller 106 comes into contact with the photosensitive drum 104. Here, the state in which the developing roller 106 and the photosensitive drum 104 are in contact with each other is defined as a contact position (second position) (state shown in FIG. 14C).

Next, the operation of moving from the contact position to the separation position will be described. Where a first force receiving portion 152Rk of the moving member 152R is pressed in the direction of the arrow X1 while the developing unit 109 is in the contact position, the moving member 152R rotates in the direction of the arrow BA (see FIG. 14C), and a bearing pressing surface 152Rq comes into contact with a pressed surface 126*c* of the gear-side bearing 126 (see FIG. 15). As a result, the developing unit 109 rotates about the swing axis K in the direction of the arrow V1 and moves to the separation position (state shown in FIG. 15).

In the separation-contact mechanism of the present embodiment, the moving member 152R cannot move in the direction of the arrow X2 unless the moving member 152R is pushed in the direction of the arrow Z2. This is because, as shown in FIG. 14A, a rib 128*g* of the development cover member 128 and a surface 152Rg of the moving member 152R facing each other interfere with each other. Therefore, unless the moving member 152R is pushed in the direction of the arrow Z2 until the surface 152Rg no longer faces the rib 128*g*, the limiting member 151R cannot be moved to the contact position.

Explanation of Drum Cover Member and Cartridge Assembly

A drum cover member 501 and a cartridge assembly 100X according to the present embodiment will be described with reference to FIGS. 1A, 1B, 16, 17, 18, 19, 20, 21, 22, 23, 24A, and 24B. The drum cover member 501 is used by being attached to the process cartridge 100 removed from the apparatus main body 170. In the process cartridge 100 removed from the apparatus main body 170, a part of the process means included in the process cartridge 100, in particular a part of the peripheral surface of the photosensitive drum 104, is exposed to the outside. The drum cover member 501 is attached in order to prevent a user from touching the exposed portion with a hand, or foreign matter such as dust from adhering to the exposed portion. The drum cover member 501 is attached to the process cartridge 100 so as to cover the exposed portion. Needless to say, the process cartridge 100 cannot be mounted on the apparatus main body 170 with the drum cover member 501 attached thereto. The drum cover member 501 is removed from the process cartridge 100 when the process cartridge 100 is mounted on the apparatus main body 170. Thus, the process cartridge 100 detached from the apparatus main body 170 and having the drum cover member 501 attached thereto, that is, a structure in which the process cartridge 100 and the drum cover member 501 are integrated, will be referred to herein and will be called the cartridge assembly 100X in the present embodiment.

Figure 16:
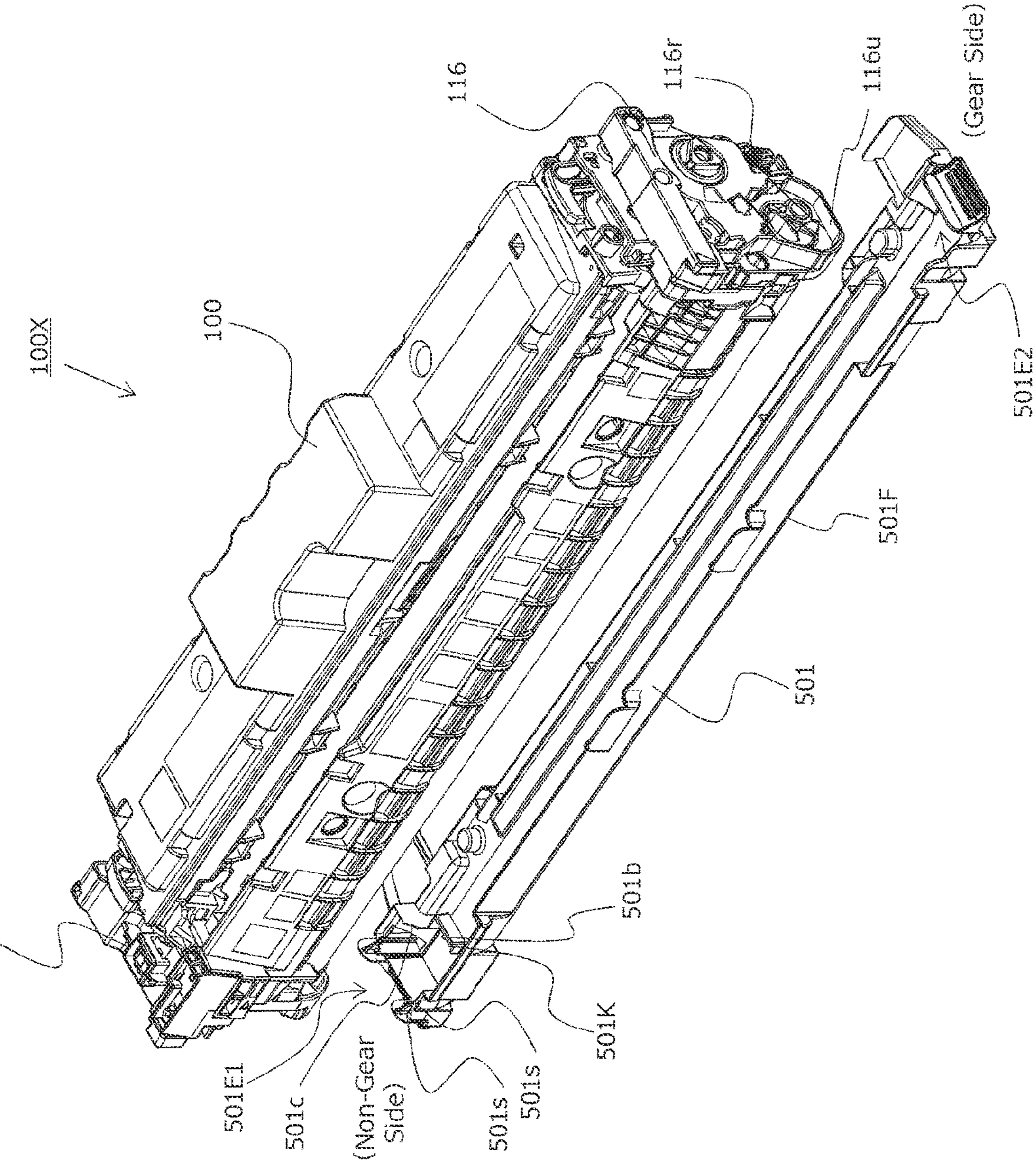
FIG. 16 is an exploded perspective view of the cartridge assembly according to Embodiment 1.
Figure 17:
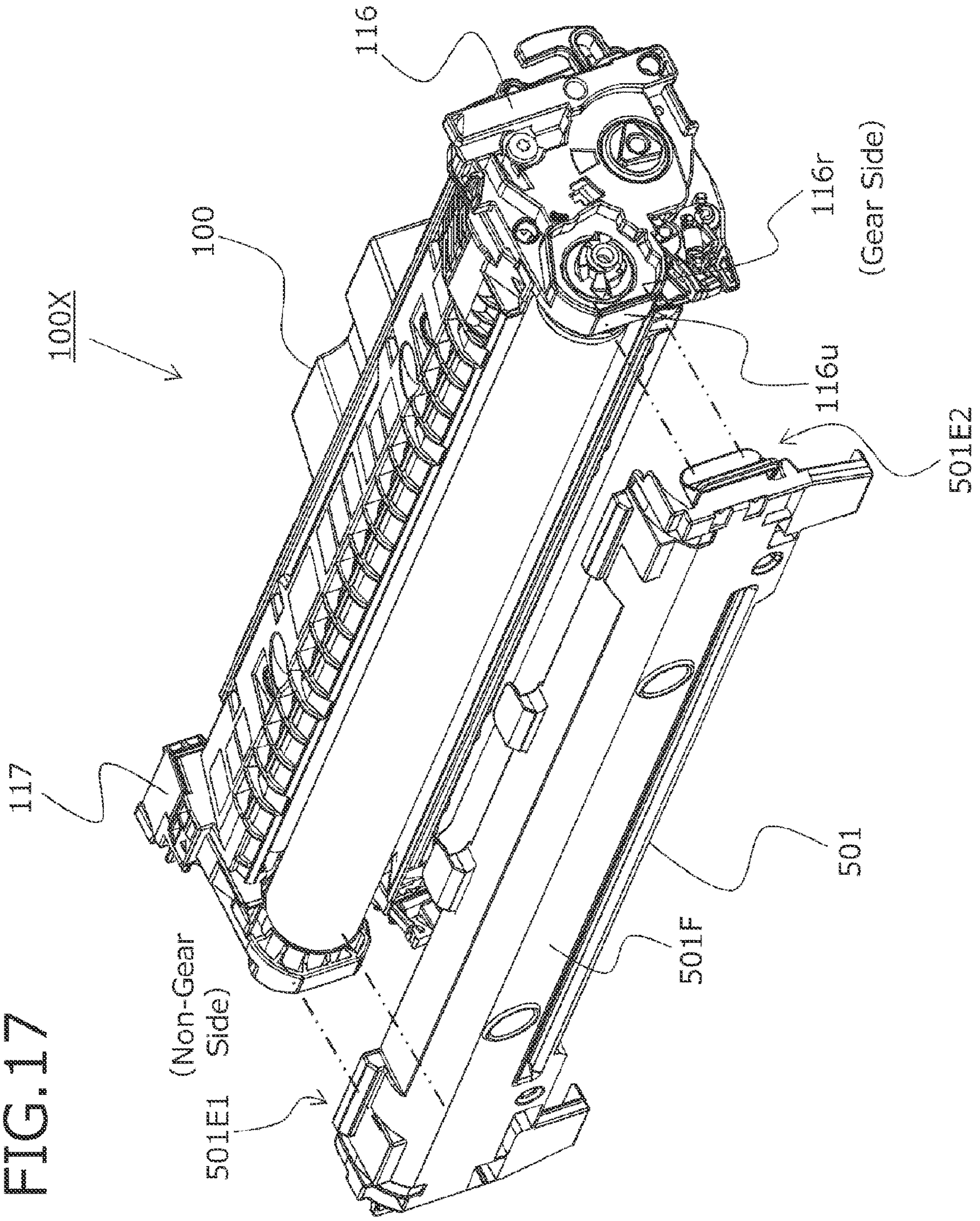
FIG. 17 is an exploded perspective view of the cartridge assembly according to Embodiment 1.
Figure 18:
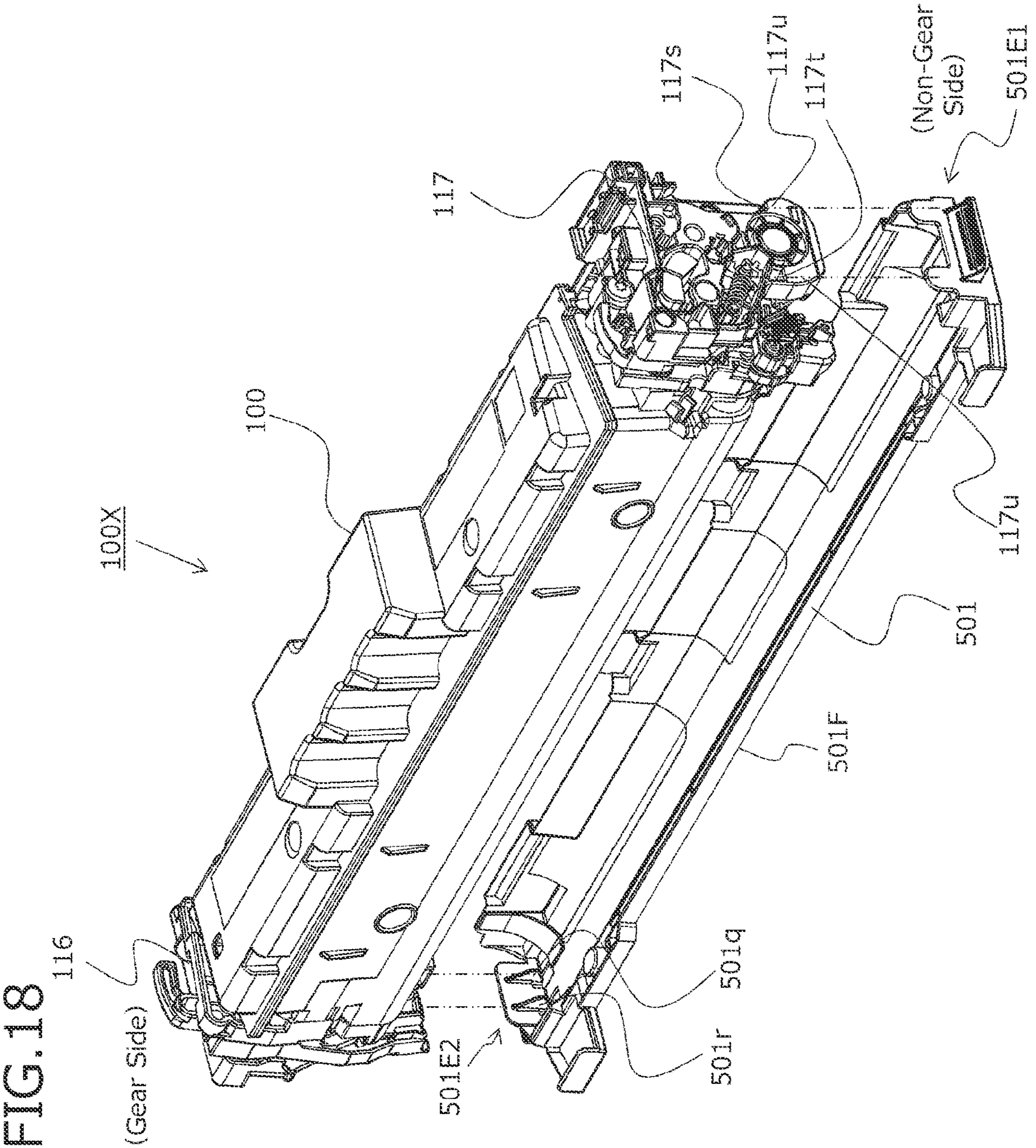
FIG. 18 is an exploded perspective view of the cartridge assembly according to Embodiment 1.
Figure 19:
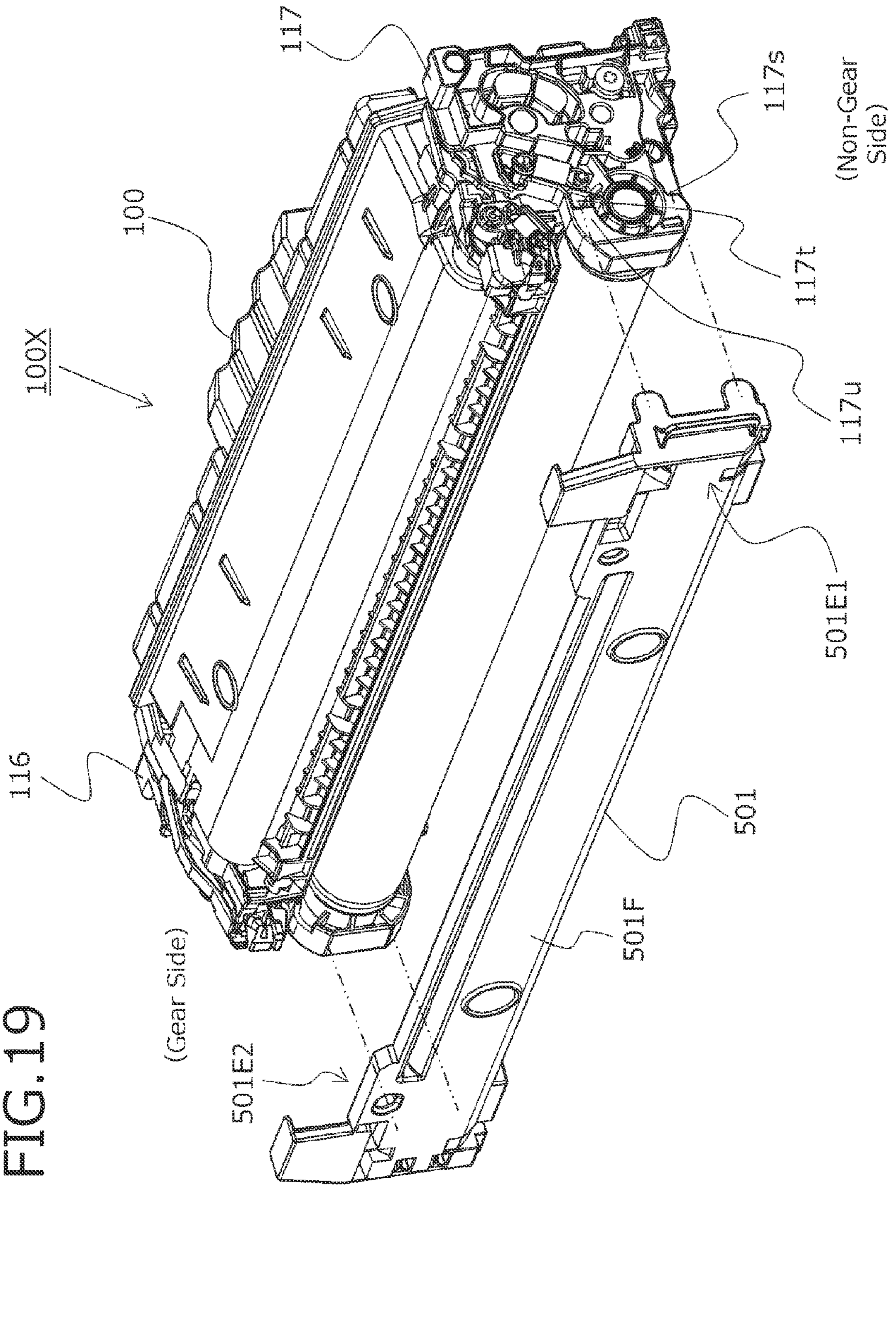
FIG. 19 is an exploded perspective view of the cartridge assembly according to Embodiment 1.

FIGS. 16 to 19 show a state in which the cartridge assembly 100X is disassembled (a state in which the process cartridge 100 and the drum cover member 501 are separated) to show the configuration of the attachment portion between the process cartridge 100 and the drum cover member 501. FIG. 16 is an exploded perspective view of the cartridge assembly 100X as viewed from the gear side and the process cartridge 100 side, that is, an exploded perspective view showing the state in which the process cartridge 100 and the drum cover member 501 are separated. FIG. 17 is an exploded perspective view of the cartridge assembly 100X as viewed from the gear side and the drum cover member 501 side, that is, an exploded perspective view showing the state in which the process cartridge 100 and the drum cover member 501 are separated. FIG. 18 is an exploded perspective view of the cartridge assembly 100X as viewed from the non-gear side and the process cartridge 100 side, that is, an exploded perspective view showing the state in which the process cartridge 100 and the drum cover member 501 are separated. FIG. 19 is an exploded perspective view of the cartridge assembly 100X as viewed from the non-gear side and the drum cover member 501 side, that is, an exploded perspective view showing the state in which the process cartridge 100 and the drum cover member 501 are separated.

Figure 20:
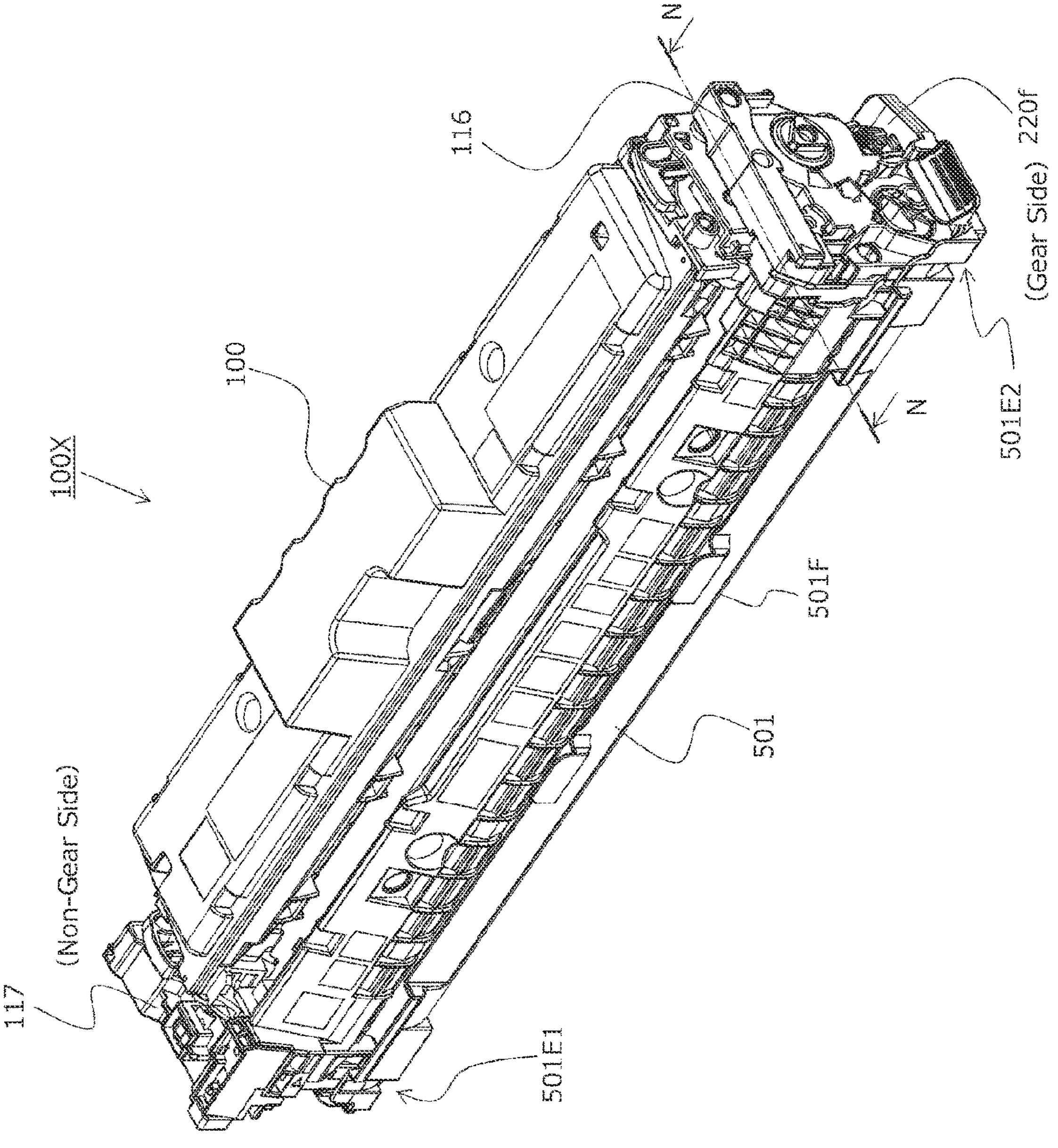
FIG. 20 is a perspective view of the cartridge assembly according to Embodiment 1.
Figure 21:
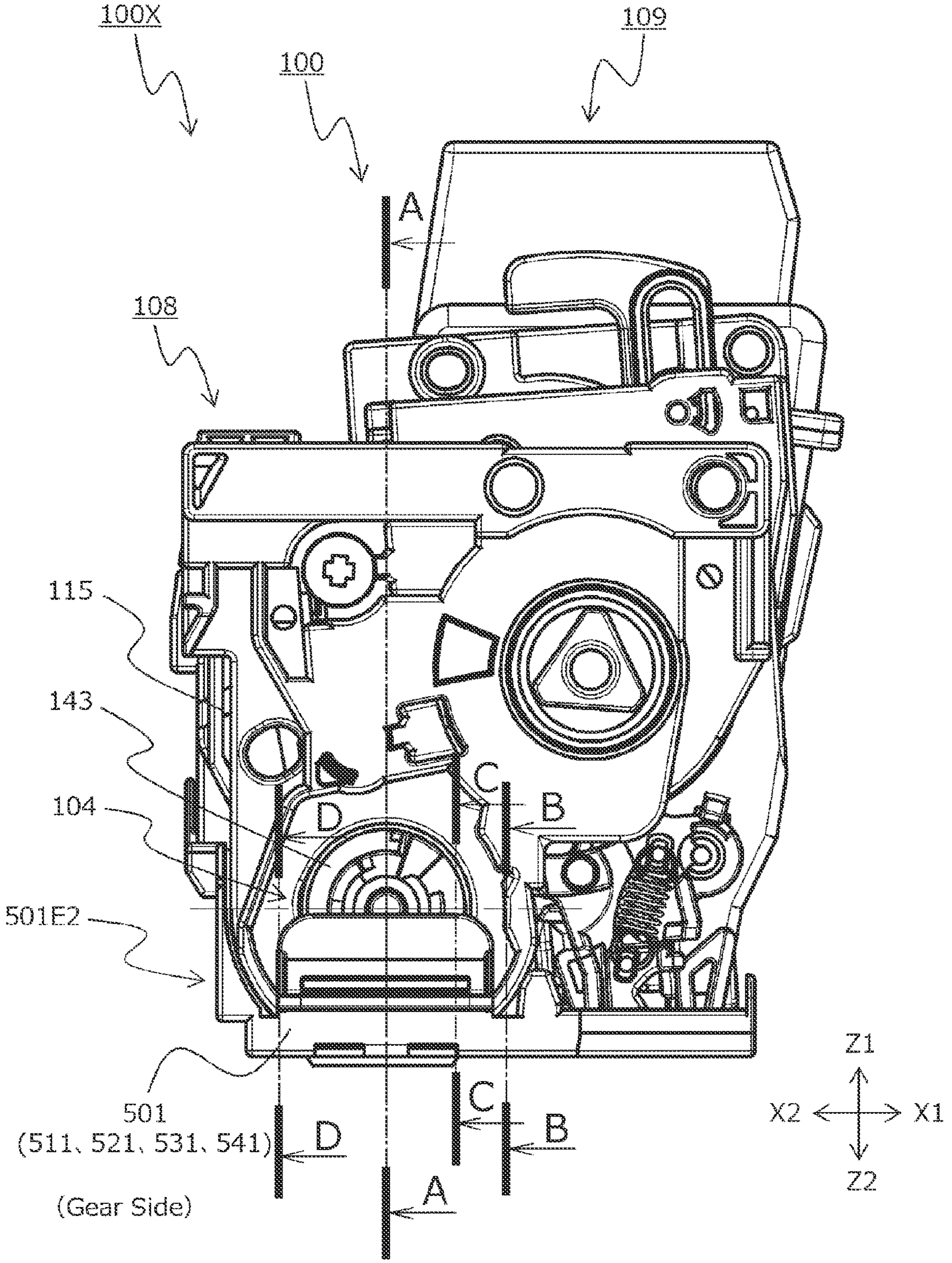
FIG. 21 is a side view of the cartridge assembly according to Embodiment 1.
Figure 22:
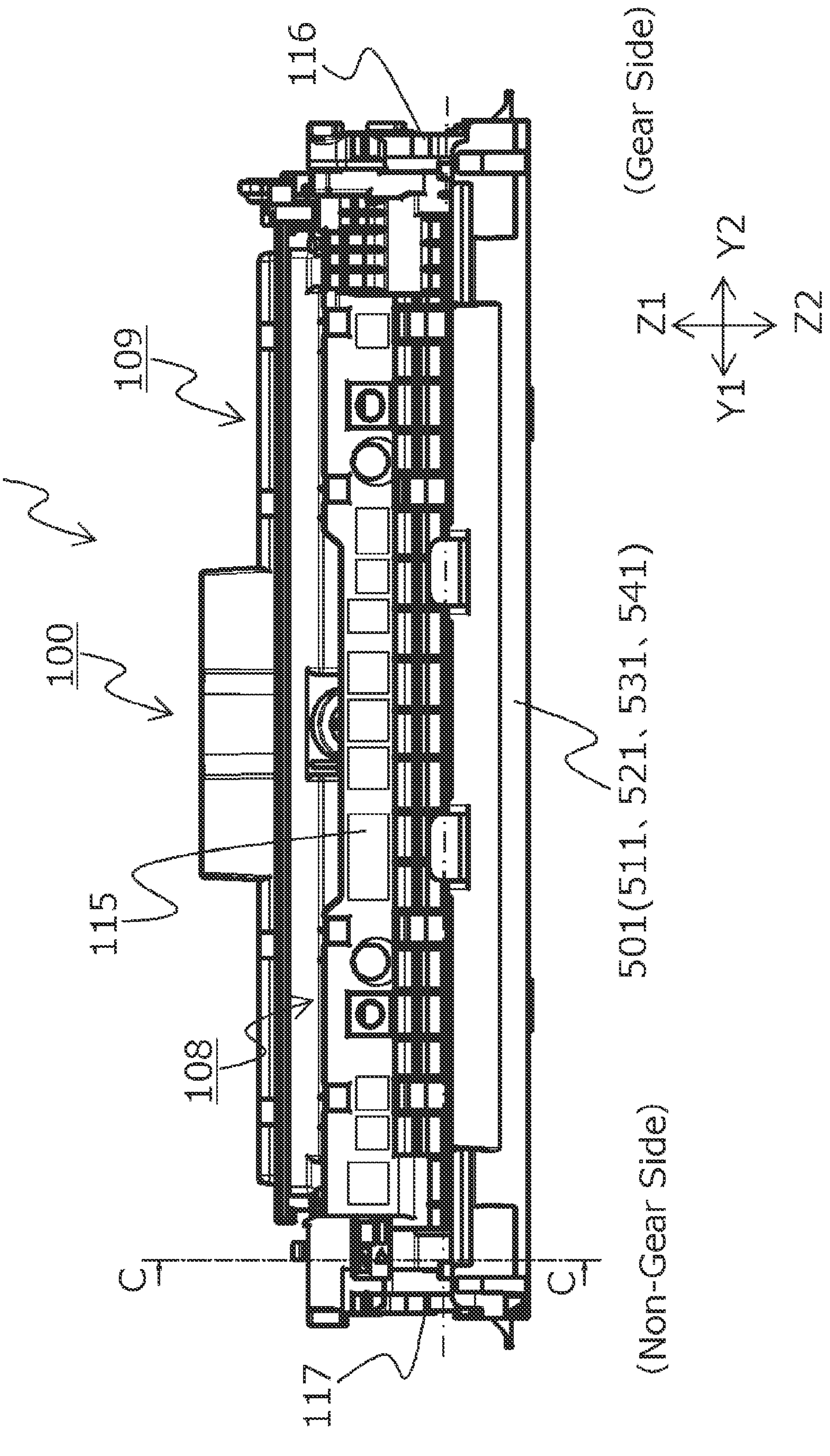
FIG. 22 is a front view of the cartridge assembly according to Embodiment 1.

FIGS. 20, 21, and 22 show a state in which the drum cover member 501 has been completely mounted on the process cartridge 100. FIG. 20 is a perspective view of the cartridge assembly 100X as viewed from the gear side. FIG. 21 is a side view of the gear side of the cartridge assembly 100X. FIG. 22 is a front view of the cartridge assembly 100X viewed from the drum unit 108 side and perpendicular to the longitudinal direction of the process cartridge 100 (Y direction in the drawing).

Figure 1A:
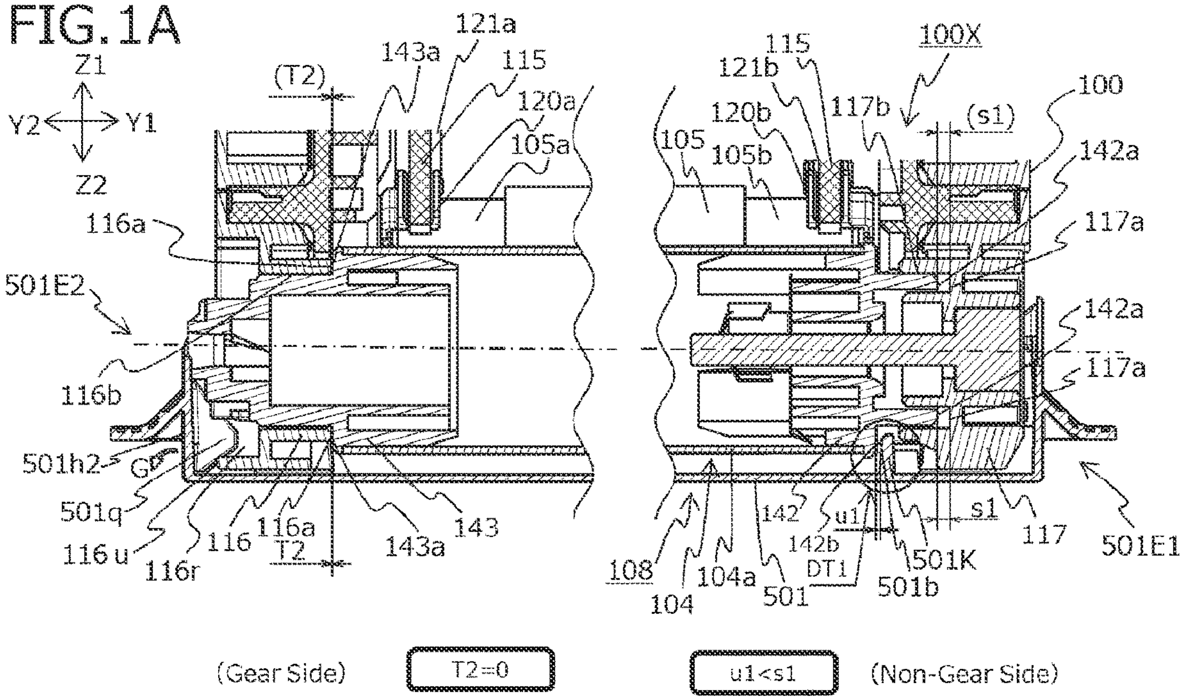
FIGS. 1A and 1B are a set of cross-sectional views of a cartridge assembly according to Embodiment 1.
Figure 1B:
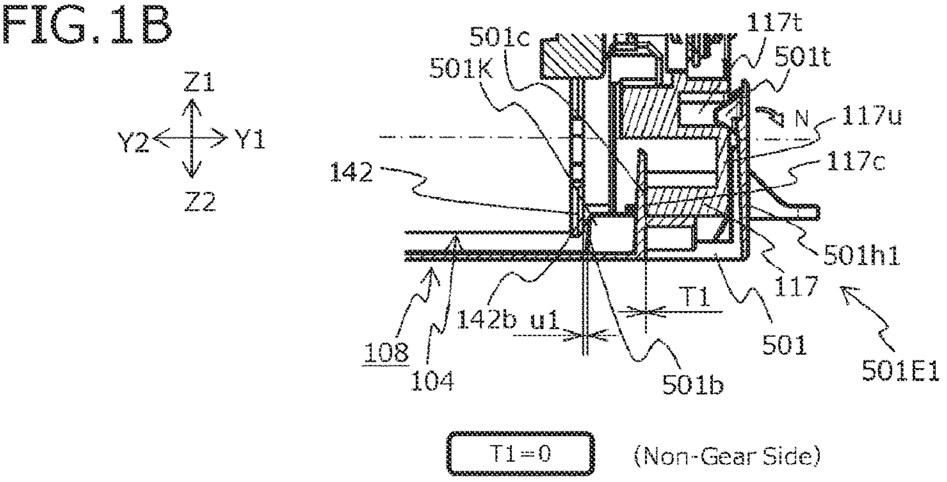

FIG. 1A is an A-A cross section (a cross section viewed from the developing unit 109 side) taken along a cutting line intersecting with the axial center of the photosensitive drum 104 in FIG. 21 in the Z direction in the drawing. FIG. 1B is a cross-sectional view of the process cartridge 100 with the drum cover member 501 attached thereto in a B-B cross section shifted in the X1 direction in the drawing from the A-A cross section (FIG. 1A) in FIG. 21. FIG. 1A shows a cross-sectional view of the gear side and the non-gear side in the A-A cross section, with the central portion being omitted. FIG. 1B shows a cross-sectional view of the non-gear side in the B-B cross section. That is, in FIGS. 1A and 1B, the arrangement relationship between the process cartridge 100 and the drum cover member 501 on the non-gear side is shown by the A-A cross section and B-B cross section, and the arrangement relationship on the gear side is shown by the A-A cross section.

Figure 23:
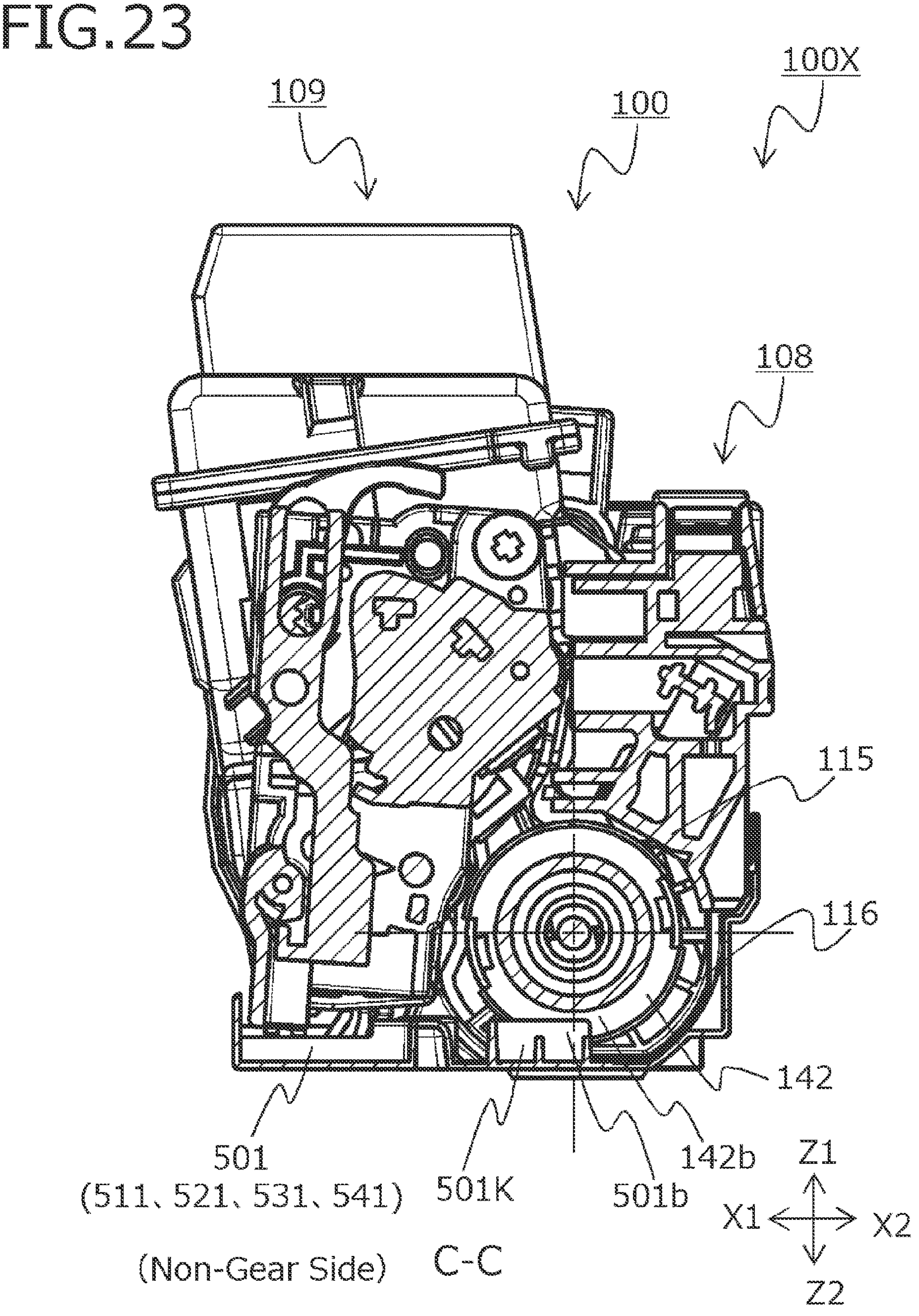
FIG. 23 is a cross-sectional view of the cartridge assembly according to Embodiment 1.
Figure 24B:
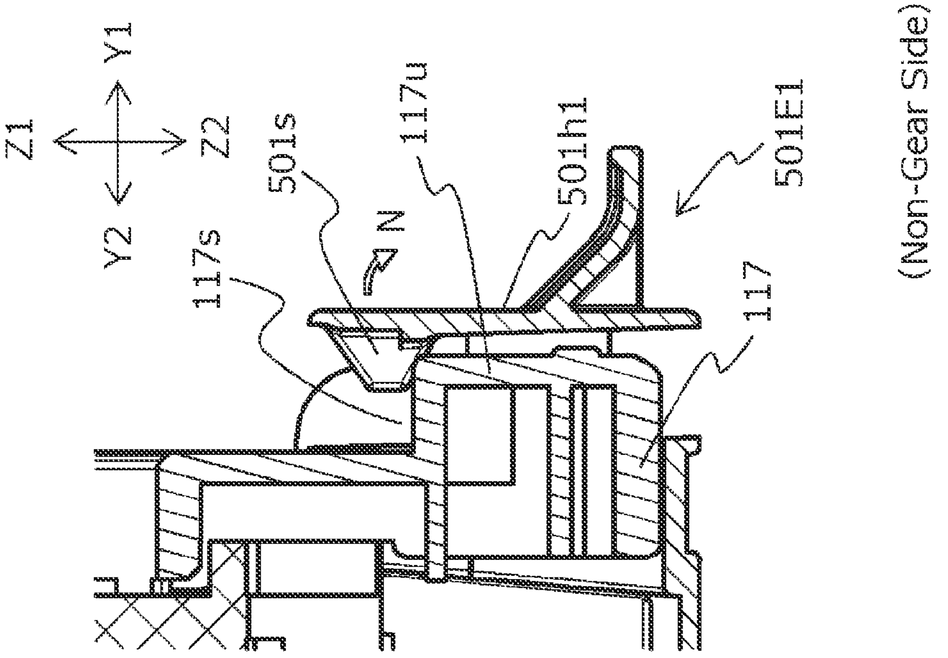
FIGS. 24A and 24B are a set of cross-sectional views of the cartridge assembly according to Embodiment 1.
Figure 24A:
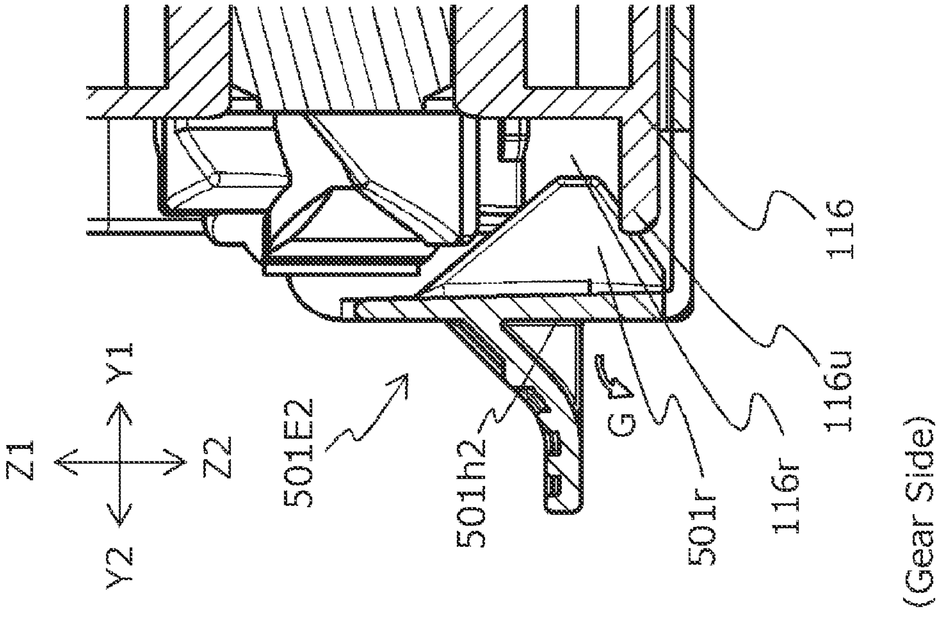

FIG. 23 is a C-C cross section of the process cartridge 100 taken along the cutting line C-C viewed from the non-gear side in FIG. 22 and shows a state in which the drum cover member 501 is attached to the process cartridge 100. FIGS. 24A and 24B are a set of cross-sectional views for explaining the configuration of an engaging portion (held portion) for realizing a state in which the drum cover member 501 locked to (held by) the process cartridge 100. FIG. 24A is a cross-sectional view of the process cartridge 100 with the drum cover member 501 attached thereto in a C-C cross section which is shifted in the X1 direction in the drawing from the A-A cross section (FIG. 1A) and shifted in the X2 direction in the drawing from the B-B cross section (FIG. 1B) in FIG. 21. FIG. 24B is a cross-sectional view of the process cartridge 100 with the drum cover member 501 attached thereto in a D-D cross section shifted in the X2 direction in the drawing from the A-A cross section (FIG. 1A) in FIG. 21.

As shown in FIGS. 16 to 19, the drum cover member 501 is attached to the process cartridge 100 along the longitudinal direction of the process cartridge 100 so as to cover the region of the process cartridge 100 where a part of the photosensitive drum 104 is exposed. The drum cover member 501 has engaging portions 501E1 and 501E2 that engage with respective end portions of the frame body in the longitudinal direction of the process cartridge 100 and has a cover portion 501F that covers the exposed portion of the photosensitive drum 104 between the engaging portions 501E1 and 501E2. The gear-side engaging portion 501E2 (second engaging portion) is configured to engage with one end portion (second end portion) in the longitudinal direction of the process cartridge 100, which is the gear-side end portion, and is provided with gear-side locking claws 501*q* and 501*r*. The non-gear side engaging portion 501E1 (first engaging portion) is configured to engage with the other end portion (first end portion) in the longitudinal direction of the process cartridge 100, which is the non-gear side end portion, and is provided with non-gear side locking claws 501*s* and 501*t*. The cover portion 501F is provided so as to extend in the longitudinal direction of the process cartridge 100 (photosensitive drum 104) between the gear-side engaging portion 501E2 and the non-gear-side engaging portion 501E1.

In the drum cover member 501, the gear-side locking claws 501*q* and 501*r* of the gear-side engaging portion 501E2 engage with a locking groove 116*r* of the gear-side cartridge cover member 116 (second end supporting portion). The gear-side cartridge cover member 116 is a portion of the frame of the process cartridge 100 that supports the gear-side end portion (second end portion) of the photosensitive drum 104. The locking groove 116*r* (second concave portion) has a shape depressed in the Y1 direction (second direction) along the longitudinal direction. The gear-side engaging portion 501E2 has an extending portion 501*h*2 (second extending portion) extending in a direction intersecting with the longitudinal direction, so as to have a portion overlapping with the locking groove 116*r* when viewed in the longitudinal direction. The gear-side locking claws 501*q* and 501*r* (second protrusions) are provided so as to protrude in the Y1 direction along the longitudinal direction from the extending portion 501*h*2. In the present embodiment, the extending portion 501*h*2 is configured to extend in a direction perpendicular to the longitudinal direction, but it may be also configured to extend in a direction at an angle to the perpendicular direction as long as the desired engagement state can be formed.

In the drum cover member 501, the non-gear-side locking claws 501*s* and 501*t* of the non-gear-side engaging portion 501E1 engage with the locking grooves 117*s* and 117*t* of the non-gear-side cartridge cover member 117 (first end supporting portion), respectively. The non-gear-side cartridge cover member 117 is a portion of the frame of the process cartridge 100 that supports the non-gear-side end portion (first end portion) of the photosensitive drum 104. The locking grooves 117*s* and 117*t* (first concave portions) have a shape depressed in the Y2 direction (first direction) along the longitudinal direction. The non-gear-side engaging portion 501E1 has an extending portion 501*h*1 (first extending portion) extending in a direction intersecting with the longitudinal direction, so as to have a portion overlapping with the locking grooves 117*s* and 117*t* when viewed in the longitudinal direction. The non-gear side locking claws 501*s* and 501*t* (first convex portions) are provided so as to protrude in the Y2 direction along the longitudinal direction from the extending portion 501*h*1. In the present embodiment, the extending portion 501*h*1 is configured to extend in a direction perpendicular to the longitudinal direction, but it may be also configured to extend in a direction at an angle to the perpendicular direction as long as the desired engagement state can be formed. The locking grooves 117*s* and 117*t* will be described in detail hereinbelow.

With the engagement structure described above, the drum cover member 501 is detachably assembled to the process cartridge 100 (state shown in FIG. 20). When assembling the drum cover member 501 to the process cartridge 100, the photosensitive drum 104 in the process cartridge 100 is adjusted so that a limiting rib 501K, which will be described hereinbelow, is inserted into a predetermined gap between the frame of the process cartridge 100 and the photosensitive drum 104. For example, the drum cover member 501 is assembled to the process cartridge 100 after the photosensitive drum 104 is brought to one side in the longitudinal direction with respect to the frame of the process cartridge 100.

As shown in FIG. 1, the photosensitive drum 104 is a unit in which three parts are integrated by press-fitting the drum flange 142 and the coupling member 143 into openings at both ends of a drum cylinder 104*a* and crimping. The drum unit 108 rotatably supports both ends of the photosensitive drum 104. That is, on the non-gear side, the shaft portion of the drum flange 142 is rotatably supported by the drum supporting hole 117*b* of the non-gear-side cartridge cover member 117. Further, on the gear side, the shaft portion of the coupling member 143 is rotatably supported by the drum supporting hole 116*b* of the gear-side cartridge cover member 116.

First, the configuration of the non-gear side of the cartridge assembly 100X will be described in detail. As shown on the non-gear side of the A-A cross section (FIG. 1A), there is a gap s1 in the longitudinal direction (Y direction in the drawing) between the first surface (first limited portion) 142*a* of the drum flange 142 and the first opposing surface (first limiting portion) 117*a* of the non-gear-side cartridge cover member 117. That is, the non-gear-side cartridge cover member 117 has the first opposing surface 117*a* as the first limiting surface that faces the first surface 142*a* of the drum flange 142 in the Y2 direction (first direction) along the longitudinal direction. Considering the dimensional variation of the related parts and also considering the use under various environments (from high temperature to low temperature), the gap s1 is provided so that the parts in the process cartridge 100 operate (rotate) smoothly without interfering with each other. Thus, the configuration is such that the photosensitive drum 104 is allowed to move within a predetermined range in the longitudinal direction with respect to the frame of the process cartridge 100 in order to ensure stable rotation of the photosensitive drum 104 during the image forming operation. In the present embodiment, the length of the gap s1 in the longitudinal direction is set to 1.2 mm as the predetermined amount, which is the movable amount of the photosensitive drum 104 allowed in a state in which the drum cover member 501 is apart from the frame of the process cartridge 100. In other words, when the drum cover member 501 is apart from the frame of the process cartridge 100, the movable amount of the photosensitive drum 104 with respect to the frame is limited to the predetermined amount as the first amount.

Further, as shown in the B-B cross section (FIG. 1B), the drum cover member 501 has the locking claw 501*t* that engages with the locking groove 117*t* of the non-gear-side cartridge cover member 117. To assemble the drum cover member 501 toward the process cartridge 100 (in the Z1 direction in the drawing), the locking claw 501*t* is retracted in the direction of the arrow N in the drawing and is locked with the locking groove 117*t* by climbing over an locking groove lower side 117*u*. Further, as for removing the locked drum cover member 501 in the direction away from the process cartridge 100 (the Z2 direction in the drawing), the removal is impossible unless a force for bending the locking claw 501*t* in the N direction is applied. The drum cover member 501 is configured so that at least the locking claw 501*t* and the component supporting the locking claw 501*t* (extending portion 501*h*1 and the like) are elastically deformable so as to enable the abovementioned displacement of the locking claw 501*t*.

Further, as shown on the gear side in the A-A cross section (FIG. 1A), the drum cover member 501 has the locking claw 501*q* that engages with the locking groove 116*r* of the gear-side cartridge cover member 116. To assemble the drum cover member 501 toward the process cartridge 100 (in the Z1 direction in the drawing), the locking claw 501*q* is retracted in the direction of the arrow G in the drawing and is locked with the locking groove 116*r* by climbing over an locking groove lower side 116*u*. Further, as for removing the locked drum cover member 501 in the direction away from the process cartridge 100 (the Z2 direction in the drawing), the removal is impossible unless a force for bending the locking claw 501*q* in the G direction is applied. The drum cover member 501 is configured so that at least the locking claw 501*q* and the component supporting the locking claw 501*q* (extending portion 501*h*2 and the like) are elastically deformable so as to enable the abovementioned displacement of the locking claw 501*q*.

As described above, the configuration is such that the locked drum cover member 501 can be selectively removed from the process cartridge 100 from the gear side and the non-gear side.

Further, as shown in the B-B cross section, the drum cover member 501 has a fifth limiting portion 501*c* (third protruding portion) facing a fifth limited portion 117*c* of the non-gear-side cartridge cover member 117. The fifth limiting portion 501*c* is a protruding portion protruding from the cover portion 501F in a direction intersecting with the longitudinal direction on the inner side in the Y2 direction with respect to the non-gear-side engaging portion 501E1 of the drum cover member 501. The fifth limiting portion 501*c* protrudes so as to have a portion overlapping with the fifth limited portion 117*c* when viewed in the longitudinal direction. After the drum cover member 501 is locked, the fifth limited portion 117*c* and the fifth limiting portion 501*c* are in contact (butting against each other) in the longitudinal direction (Y1 direction) (gap T1=0). In the present embodiment, the fifth limiting portion 501*c* is configured to protrude in a direction perpendicular to the longitudinal direction, but it may be configured to extend in a direction at an angle with respect to the perpendicular direction as long as the desired state of contact with the fifth limited portion 117*c* can be formed.

As shown on the non-gear side of the A-A cross section, the drum cover member 501 has the limiting rib 501K (first protruding portion). The limiting rib 501K is a protruding portion protruding from the cover portion 501F in a direction intersecting with the longitudinal direction on the inner side in the Y2 direction with respect to the non-gear-side engaging portion 501E1 and the fifth limiting portion 501*c* of the drum cover member 501. The limiting rib 501K protrudes so as to have a portion overlapping with the second limited portion 142*b* of the drum flange 142, which is the first end portion of the photosensitive drum 104 when viewed in the longitudinal direction. The limiting rib 501K is provided so as to face the second limited portion 142*b* with a gap in the longitudinal direction therebetween. The limiting rib 501K is a limiting portion configured to come into contact with the longitudinal end surface of the photosensitive drum 104 in the case where the photosensitive drum 104 moves in the longitudinal direction, thereby limiting the movable amount of the photosensitive drum 104 with respect to the frame of the process cartridge 100 to a predetermined amount. In the present embodiment, the limiting rib 501K is configured to protrude in a direction perpendicular to the longitudinal direction, but it may be configured to extend in a direction at an angle with respect to the perpendicular direction, as long as the movement of the photosensitive drum 104 in the longitudinal direction can be limited to the desired amount.

FIG. 23 is a C-C cross section of the process cartridge 100 which is taken along the cutting line C-C on the non-gear side in FIG. 22 as mentioned hereinabove and shows a state in which the drum cover member 501 is attached. As shown in FIG. 23, the limiting rib 501K has a second limiting portion 501*b* facing the second limited portion 142*b* of the drum flange 142. When the photosensitive drum 104 is viewed in the longitudinal direction, the second limited portion 142*b* and the second limiting portion 501*b* overlap with each other. As shown in FIG. 1A, there is a gap u1 between the second limited portion 142*b* and the second limiting portion 501*b* in the longitudinal direction of the photosensitive drum 104 (Y direction in the drawing). The gap u1 is set to be smaller (narrower) than the gap s1 (u1<s1).

Next, the configuration of the gear side of the cartridge assembly 100X will be described in detail. As shown on the gear side of the A-A cross section in FIG. 1A, a third surface (third limited portion) 143*a* of the coupling member 143 and a third opposing surface (third limiting portion) 116*a* of the gear-side cartridge cover member 116 are in contact with each other in the longitudinal direction (Y direction in the drawing) (gap T2=0).

Here, the configuration of the charging roller 105 and the photosensitive drum 104 will be described. As shown in FIG. 1A, the drum frame 115 supports a non-gear-side charging roller bearing 120*b* and a gear-side charging roller bearing 120*a* so that the bearings can move in substantially the Z direction in the drawing. The non-gear-side charging roller bearing 120*b* and the gear-side charging roller bearing 120*a* rotatably support core metal portions 105*b* and 105*a* at both ends of the charging roller 105. Pressure springs 121*b* and 121*a* are provided between the drum frame 115 and the non-gear-side charging roller bearing 120*b*, and between the drum frame and the gear-side charging roller bearing 120*a*, respectively, to bias the charging roller 105 toward the photosensitive drum 104 by a predetermined pressure.

As described above, there is a gap s1 between the photosensitive drum 104 and the non-gear-side cartridge cover member 117 and the gear-side cartridge cover member 116 which are arranged on both sides thereof. Therefore, in a state in which the drum cover member 501 is not mounted, the photosensitive drum 104 can move in the longitudinal direction (Y direction in the drawing) through the distance equal to the gap s1 with respect to the frame of the process cartridge 100 when the process cartridge 100 is transported or handled by the user. In addition, there is a possibility that reciprocating movement is repeated in the longitudinal direction (Y direction in the drawing).

As a result, rubbing can occur at the portion on the photosensitive drum 104 that is in contact with the charging roller 105, and charging memory may occur depending on the state of the rubbing, which may appear as horizontal streaks in the image at the time of printing. The state in which the drum cover member 501 is not mounted on the process cartridge 100 is shown in FIG. 10.

In the most characteristic configuration of the present embodiment, the limiting rib 501K provided on the drum cover member 501 limits the relative movement of the photosensitive drum 104 with respect to the frame of the process cartridge 100 in the longitudinal direction. As shown in FIGS. 1A and 1B, at the time of mounting the drum cover member 501, when the photosensitive drum 104 moves in the longitudinal direction of the photosensitive drum 104 (Y1 direction in the drawing), the second limited portion 142*b* of the drum flange 142 comes into contact with the second limiting portion 501*b* of the limiting rib 501K of the drum cover member 501. The gap u1 is provided in the longitudinal direction between the second limited portion 142*b* and the second limiting portion 501*b*. Therefore, the photosensitive drum 104 may move in the longitudinal direction (Y1 direction in the drawing) only through the distance equal to the gap u1. Further, the photosensitive drum 104 may repeatedly reciprocate in the longitudinal direction (Y direction in the drawing) with a movement amount corresponding to the gap u1. In the present embodiment, the gap u1 is set to 0.4 mm.

That is, the size (interval) of the gap u1 that allows relative movement in the longitudinal direction between the photosensitive drum 104 and the drum cover member 501 is set smaller (shorter) than the gap s1 that allows relative movement in the longitudinal direction between the photosensitive drum 104 and the drum unit 108 when the drum cover member 501 is not mounted (u1<s1). That is, the movable amount of the photosensitive drum 104 with respect to the frame of the process cartridge 100 is limited to u1 as the second amount narrower than s1 as the first amount by the limiting rib 501K as the limiting portion. This makes it possible to reduce the amount of movement of the photosensitive drum 104 in the longitudinal direction within the drum unit 108 (the frame of the process cartridge 100). Therefore, it is possible to reduce the rubbing distance of the portion on the photosensitive drum 104 that is in contact with the charging roller 105, thereby suppressing the occurrence of charging memory due to rubbing of the contact portions of the photosensitive drum 104 and the charging roller 105 in the longitudinal direction. As a result, it is possible to provide the user with a good printed image.

Further, the limiting rib 501K is provided integrally with the drum cover member 501. Therefore, the limiting rib 501K is released at the same time as the drum cover member 501 is removed from the process cartridge 100 which is the operation performed by the user when mounting the process cartridge 100 on the apparatus main body 170. Therefore, for example, compared to the case where the limiting rib is separate from the drum cover member and the limiting rib needs to be released separately from the removal of the drum cover member, the process of releasing the limitation becomes simpler, and the user needs not to worry about forgetting to release the limiting rib 501K.

That is, according to the present embodiment, the limiting configuration that limits the longitudinal movement of the photosensitive drum 104 with respect to the process cartridge 100 removed from the apparatus main body 170 is integrated with the drum cover member 501 for covering the exposed portion of the photosensitive drum 104. Therefore, the exposed portion of the photosensitive drum 104 can be covered and the longitudinal movement of the photosensitive drum 104 can be limited by one step of attaching the drum cover member 501 to the process cartridge 100. Further, when the process cartridge 100 is mounted on the apparatus main body 170, it is necessary to remove the drum cover member 501, and both the cover configuration and limiting configuration described hereinabove can be released at the same time by one step of removing the drum cover member 501. That is, the protection of the exposed portion of the photosensitive drum 104 during transportation and storage of the process cartridge 100 and the suppression of sliding between the photosensitive drum 104 and members that come into contact therewith can be realized with a simple and low-cost configuration without causing the user to make mistakes.

Further, the gap u1 that allows relative displacement in the longitudinal direction between the drum cover member 501 and the photosensitive drum 104 in a state where the drum cover member 501 is attached to the process cartridge is smaller than the gap s1 (u1<s1). Therefore, depending on the dimensional variation of related parts, or depending on the influence of changes in the usage environment (for example, from high temperature to low temperature), there is a possibility that contact or interference between parts that would not occur with the gap s1 may occur. However, since the drum cover member 501 is attached during non-printing operation (during non-image forming operation), such contact or interference between parts does not directly affect image forming accuracy. Therefore, while the drum cover member 501 is attached, the above-described amount of interference may be absorbed by deformation of the constituent parts of the cartridge assembly 100X. Since the photosensitive drum 104 is in a non-rotating state, contact with the related parts in the longitudinal direction is allowed.

As described above, when the drum cover member 501 is mounted, the gap in which the photosensitive drum 104 can move in the longitudinal direction can be reduced. When the drum cover member 501 is removed (at the time of printing), a predetermined gap s1 that does not affect the rotation of the photosensitive drum 104 can be present. As described above, the gap s1 is a gap in the longitudinal direction (Y direction in the drawing) between the first surface (first limited portion) 142*a* of the drum flange 142 and the first opposing surface (first limiting portion) 117*a* of the non-gear-side cartridge cover member 117.

Here, a cleaning means to be used in the process cartridge can be exemplified by a cleaning member (not shown). The cleaning member has a role of removing waste toner from the surface of the photosensitive drum. The cleaning member is configured of, for example, a rubber blade, which is an elastic member, and a supporting member that supports the rubber blade, and the supporting member is fixed to a cleaning frame so that the rubber blade contacts the photosensitive drum in a direction counter to the rotation direction of the photosensitive drum. The removed waste toner is stored in a waste toner chamber formed by the cleaning frame and the cleaning member.

The process cartridge 100 according to the present embodiment does not use (is not provided with) a cleaning member, and the load acting as a brake on the photosensitive drum 104 rotatably supported by the frame is smaller than the load in the process cartridge using the cleaning member. As a result, the photosensitive drum 104 can be easily moved in the longitudinal direction (Y direction in the drawing) inside the process cartridge 100. Therefore, it can be important to reduce the amount of movement of the photosensitive drum 104 in the longitudinal direction (Y direction in the drawing) inside the process cartridge 100 by the configuration of the cartridge assembly 100X described above.

Embodiment 2

A cartridge assembly 100X2 (the process cartridge 100 and a drum cover member 511) according to Embodiment 2 of the present invention will be described with reference to FIGS. 25A and 25B. In the following description of Embodiment 2, the description of the configurations common to Embodiment 1 will be omitted. Matters not specifically described herein in Embodiment 2 are common to Embodiment 1. Parts in the configuration of Embodiment 2 are indicated by the reference numerals "511" plus a letter in Embodiment 2, as opposed to the reference numerals "501" plus a letter in Embodiment 1.

Figure 25A:
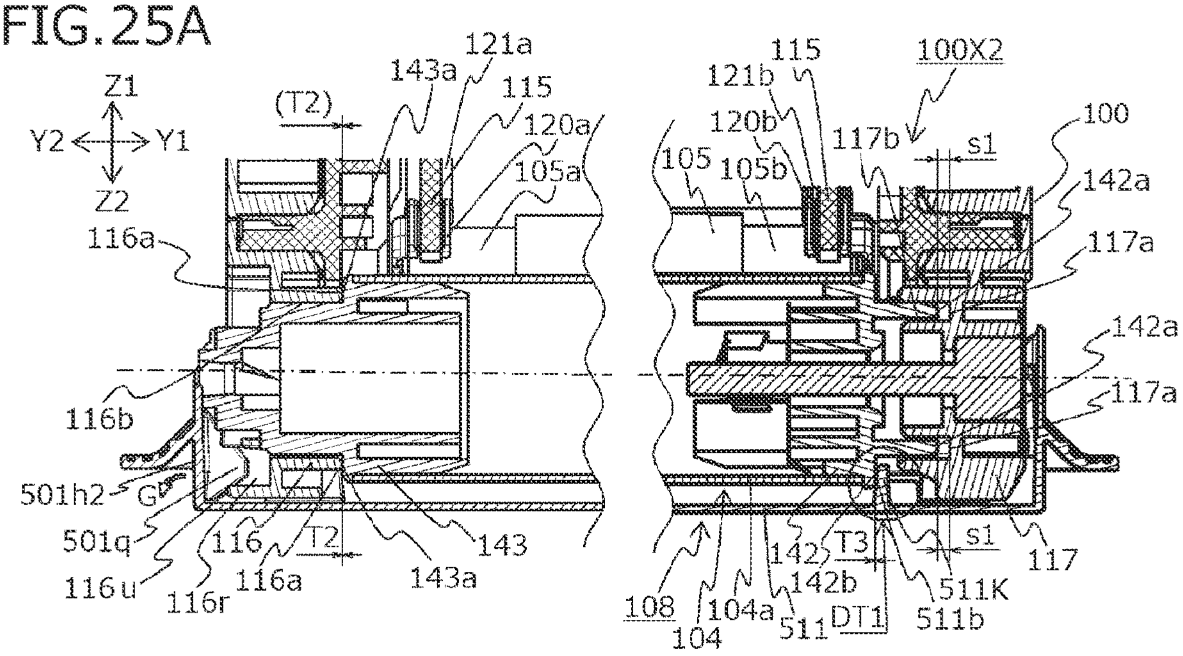
FIGS. 25A and 25B are a set of cross-sectional views of the cartridge assembly according to Embodiment 2.

FIG. 25A is an A-A cross section taken along a cutting line intersecting with the axial center of the photosensitive drum 104 in FIG. 21 in the Z direction in the drawing. FIG. 25B is a cross-sectional view of the process cartridge 100 with the drum cover member 511 attached thereto in a B-B cross section shifted in the X1 direction in the drawing from the A-A cross section (FIG. 25A) in FIG. 21. FIG. 25A shows a cross-sectional view of the gear side and the non-gear side in the A-A cross section, with the central portion being omitted. FIG. 25B shows a cross-sectional view of the non-gear side in the B-B cross section. That is, in FIGS. 25A and 25B, the arrangement relationship between the process cartridge 100 and the drum cover member 511 on the non-gear side is shown by the A-A cross section and B-B cross section, and the arrangement relationship on the gear side is shown by the A-A cross section.

Embodiment 2 differs from Embodiment 1 in the configuration of a limiting rib 511K. The limiting rib 511K is a protruding portion protruding from the cover portion 501F in a direction intersecting with the longitudinal direction on the inner side in the Y2 direction with respect to the non-gear-side engaging portion 501E1 and a fifth limiting portion 511*c* of the drum cover member 511. The limiting rib 511K protrudes so as to have a portion overlapping with the second limited portion 142*b* of the drum flange 142, which is the first end portion of the photosensitive drum 104, when viewed in the longitudinal direction. In the most characteristic configuration of Embodiment 2, the limiting rib 511K provided on the drum cover member 501 limits the relative movement of the photosensitive drum 104 with respect to the frame of the process cartridge 100 in the longitudinal direction. That is, the limiting rib 501K of Embodiment 1 has a gap u1 between itself and the second limiting portion 501*b*, allowing a certain amount of relative movement. By contrast, the limiting rib 511K of Embodiment 2 is configured to contact (butt against) the second limited portion 142*b* of the drum flange 142 of the photosensitive drum 104 without a gap. More specifically, in a state in which the drum cover member 511 is mounted on the process cartridge 10, a second limiting portion 511*b* of the limiting rib 511K of the drum cover member 511 is in contact with the second limited portion 142*b* of the drum flange 142 of the photosensitive drum 104 (T3=0). In other respects, the configuration of Embodiment 2 is the same as the configuration of Embodiment 1.

As described above, with the cartridge assembly 100X2 (drum cover member 511) according to the present embodiment, the possibility of the photosensitive drum 104 moving in the longitudinal direction (Y direction in the drawing) can be eliminated. Therefore, it is possible to reduce the rubbing distance of the portion on the photosensitive drum 104 that is in contact with the charging roller 105, thereby suppressing the occurrence of charging memory due to rubbing of the contact portions of the photosensitive drum 104 and the charging roller 105 in the longitudinal direction. As a result, it is possible to provide the user with a good printed image.

Embodiment 3

A cartridge assembly 100X3 (the process cartridge 100 and a drum cover member 521) according to Embodiment 3 of the present invention will be described with reference to FIGS. 26A and 26B. In the following description of Embodiment 3, the description of the configurations common to Embodiments 1 and 2 will be omitted. Matters not specifically described herein in Embodiment 3 are common to Embodiments 1 and 2. Parts in the configuration of Embodiment 3 are indicated by the reference numerals "521" plus a letter in Embodiment 3, as opposed to the reference numerals "501" plus a letter in Embodiment 1.

Figure 26A:
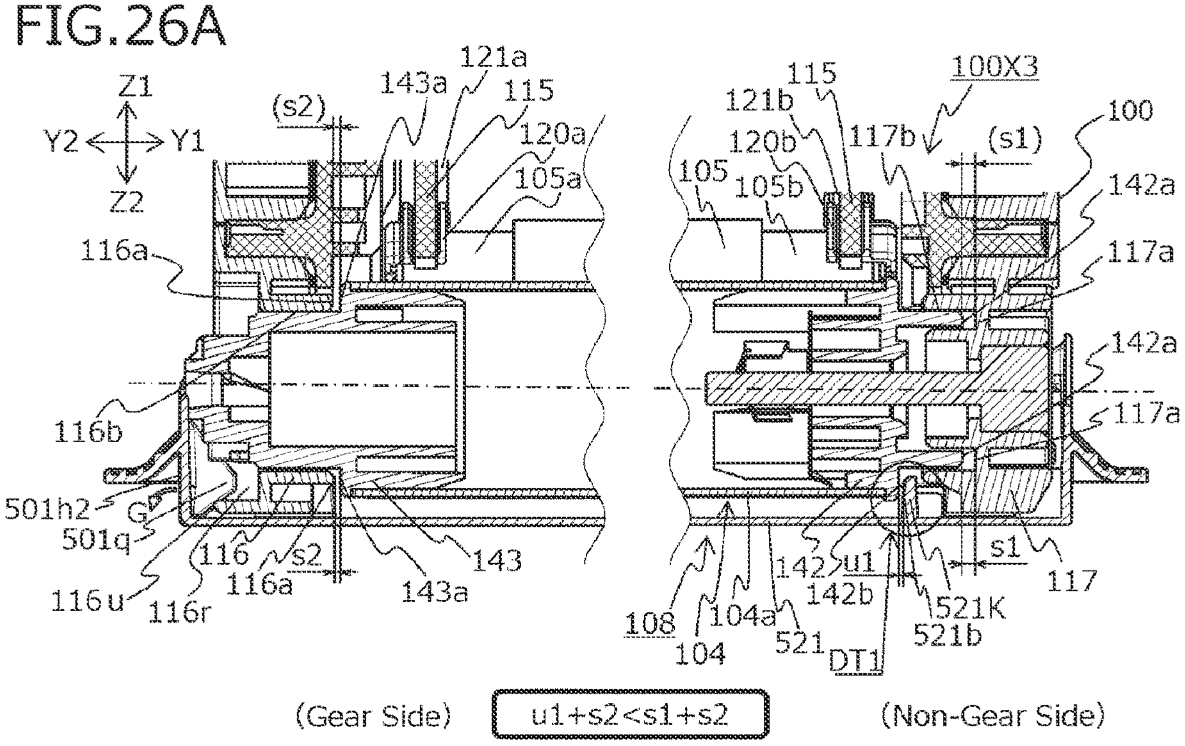
FIGS. 26A and 26B are a set of cross-sectional views of the cartridge assembly according to Embodiment 3.
Figure 26B:
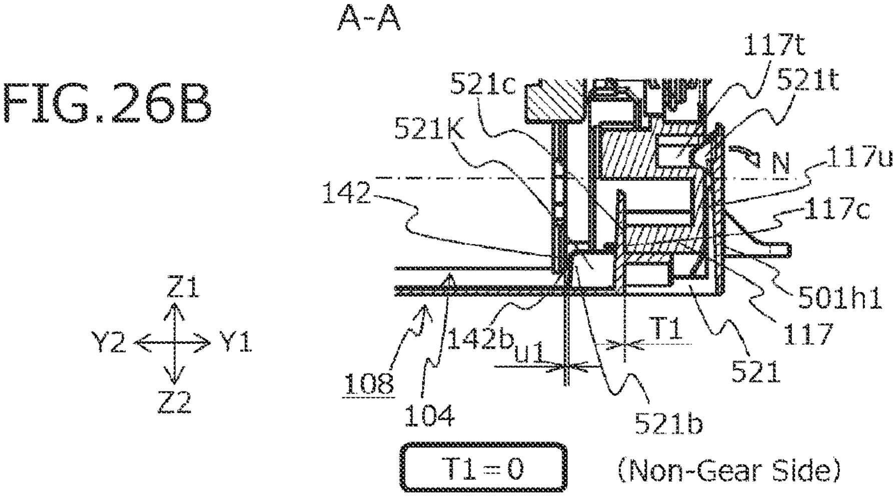

FIG. 26A is an A-A cross section taken along a cutting line intersecting with the axial center of the photosensitive drum 104 in FIG. 21 in the Z direction in the drawing. FIG. 26B is a cross-sectional view of the process cartridge 100 with the drum cover member 521 attached thereto in a B-B cross section shifted in the X1 direction in the drawing from the A-A cross section (FIG. 26A) in FIG. 21. FIG. 26A shows a cross-sectional view of the gear side and the non-gear side in the A-A cross section, with the central portion being omitted. FIG. 26B shows a cross-sectional view of the non-gear side in the B-B cross section. That is, in FIGS. 26A and 26B, the arrangement relationship between the process cartridge 100 and the drum cover member 521 on the non-gear side is shown by the A-A cross section and B-B cross section, and the arrangement relationship on the gear side is shown by the A-A cross section.

Similarly to the cartridge assembly 100X according to Embodiment 1, the cartridge assembly 100X3 according to Embodiment 3 is provided with the gap s1 that allows relative movement of the photosensitive drum 104 in the process cartridge 100 in the longitudinal direction. That is, as shown at the non-gear side in FIG. 26A, considering the dimensional variation of the related parts and also considering the use under various environments (from high temperature to low temperature), the gap s1 is provided so that the parts in the process cartridge 100 operate (rotate) smoothly without interfering with each other.

Embodiment 3 differs from Embodiment 1 in the configuration on the gear side. Specifically, as shown on the gear side in FIG. 26A, there is a gap s2 in the longitudinal direction (Y direction in the drawing) between the third surface (third limited portion) 143*a* of the coupling member 143 and the third opposing surface (third limiting portion) 116*a* of the gear-side cartridge cover member 116. That is, the gear-side cartridge cover member 116 has the third opposing surface 116*a* as a second limiting surface facing the third surface 143*a* of the coupling member 143 in the Y1 direction (second direction) along the longitudinal direction. Therefore, the movable amount (predetermined amount) in the longitudinal direction (Y direction in the drawing) of the photosensitive drum 104 when the drum cover member 521 is not mounted is set larger (s1+s2) than in Embodiment 1. In other respects, the configuration of Embodiment 3 is the same as the configurations of Embodiments 1 and 2.

As in Embodiment 1, in Embodiment 3, the gap u1 is also set smaller (narrower) than the gap s1 (u1<s1), as shown on the non-gear side in FIG. 26A. Therefore, a sum of movable amounts of the photosensitive drum 104 in the longitudinal direction (Y direction in the drawing) when the drum cover member 521 is mounted is u1+s2. Meanwhile, a sum of movable amounts of the photosensitive drum 104 in the longitudinal direction (Y direction in the drawing) when the drum cover member 521 is not mounted is s1+s2. Therefore, the length (range) of the distance in which the photosensitive drum 104 is allowed to move relative to the process cartridge 100 in the longitudinal direction is shortened (narrowed) by mounting the drum cover member 521 (u1+s2<s1+s2).

As described above, in the state where the drum cover member 521 is attached, it is possible to reduce the rubbing distance of the portion on the photosensitive drum 104 that is in contact with the charging roller 105. Therefore, it is possible to suppress the occurrence of charging memory due to rubbing of the contact portions of the photosensitive drum 104 and the charging roller 105 in the longitudinal direction. As a result, it is possible to provide the user with a good printed image.

Embodiment 4

A cartridge assembly 100X4 (the process cartridge 100 and a drum cover member 531) according to Embodiment 4 of the present invention will be described with reference to FIG. 27. In the following description of Embodiment 4, the description of the configurations common to Embodiments 1, 2, and 3 will be omitted. Matters not specifically described herein in Embodiment 4 are common to Embodiments 1, 2, and 3. Parts in the configuration of Embodiment 4 are indicated by the reference numerals "531" plus a letter in Embodiment 4, as opposed to the reference numerals "501" plus a letter in Embodiment 1.

Figure 27A:
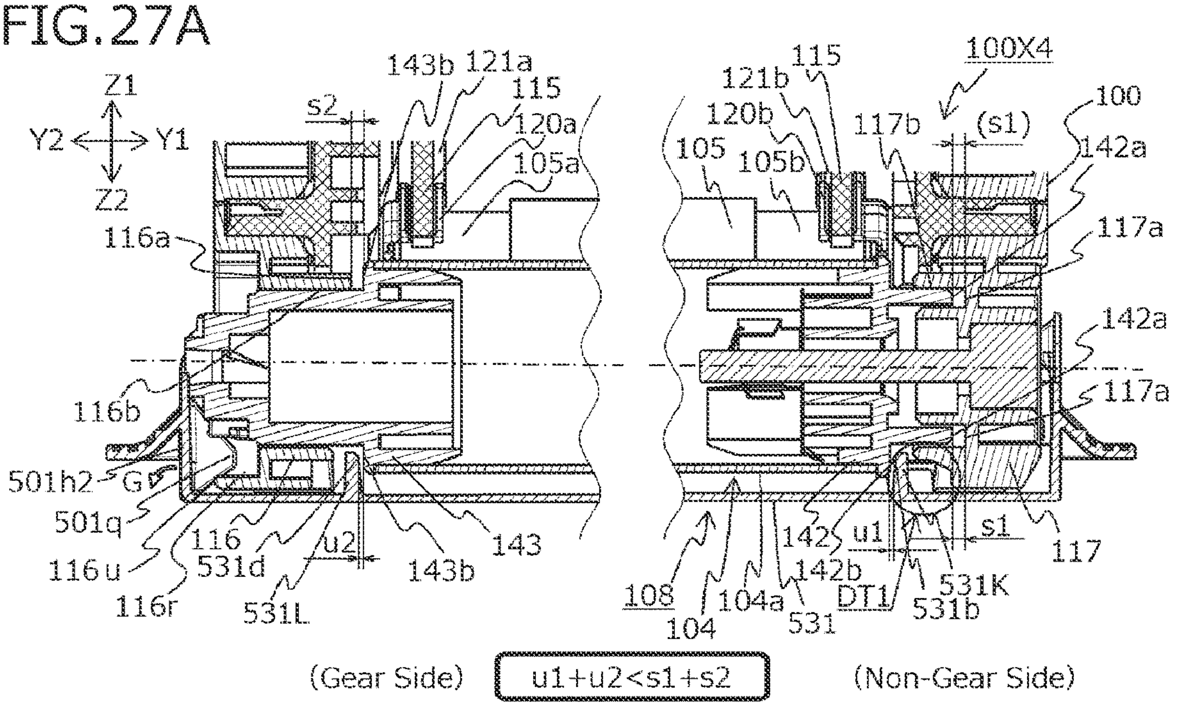
FIGS. 27A and 27B are a set of cross-sectional views of the cartridge assembly according to Embodiment 4.
Figure 27B:
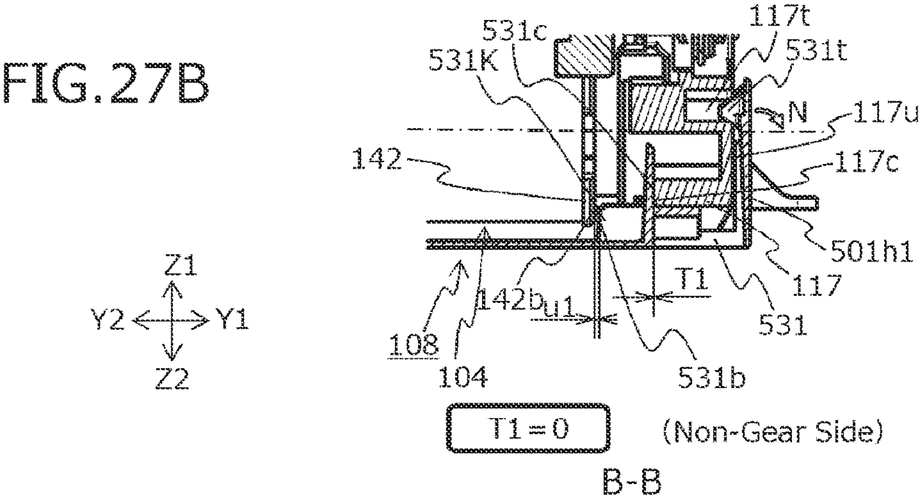

FIG. 27A is an A-A cross section taken along a cutting line intersecting with the axial center of the photosensitive drum 104 in FIG. 21 in the Z direction in the drawing. FIG. 27B is a cross-sectional view of the process cartridge 100 with the drum cover member 531 attached thereto in a B-B cross section shifted in the X1 direction in the drawing from the A-A cross section (FIG. 27A) in FIG. 21. FIG. 27A shows a cross-sectional view of the gear side and the non-gear side in the A-A cross section, with the central portion being omitted. FIG. 27B shows a cross-sectional view of the non-gear side in the B-B cross section. That is, in FIGS. 27A and 27B, the arrangement relationship between the process cartridge 100 and the drum cover member 531 on the non-gear side is shown by the A-A cross section and B-B cross section, and the arrangement relationship on the gear side is shown by the A-A cross section.

Embodiment 4 differs from Embodiment 1 in the configuration on the gear side. As shown on the gear side in FIG. 27A, there is the gap s2 in the longitudinal direction (Y direction in the drawing) between the third surface (third limited portion) 143*a* of the coupling member 143 and the third opposing surface (third limiting portion) 116*a* of the gear-side cartridge cover member 116. Considering the dimensional variation of the related parts and also considering the use under various environments (from high temperature to low temperature), the gap is provided so that the parts in the process cartridge 100 with the detached drum cover member 531 operate (rotate) smoothly without interfering with each other. As the gap, in Embodiment 4, a gap s2 is provided in addition to the gap s1 described in Embodiment 1.

As shown on the gear side in FIG. 27A (A-A cross section), the drum cover member 531 has a limiting rib 531L (second protruding portion). The limiting rib 531L is a protruding portion protruding from the cover portion 501F in a direction intersecting with the longitudinal direction on the inner side in the Y1 direction with respect to the gear-side engaging portion 501E2 of the drum cover member 531. The limiting rib 531L protrudes so as to have a portion overlapping with the fourth limited portion 143*b* of the coupling member 143, which is the second end portion of the photosensitive drum 104 when viewed in the longitudinal direction. The limiting rib 531L is provided so as to face the fourth limited portion 143*b* with a gap in the longitudinal direction therebetween. In the present embodiment, the limiting rib 531L is configured to protrude in a direction perpendicular to the longitudinal direction, but it may be configured to extend in a direction at an angle with respect to the perpendicular direction, as long as the movement of the photosensitive drum 104 in the longitudinal direction can be limited to the desired amount.

The limiting rib 531L has a fourth limiting portion 531d facing the fourth limited portion 143b of the coupling member 143. When the photosensitive drum 104 is viewed in the longitudinal direction, the fourth limited portion 143b and the fourth limiting portion 531d overlap with each other. A gap u2 is provided between the fourth limited portion 143b and the fourth limiting portion 531d in the longitudinal direction of the photosensitive drum 104 (Y direction in the drawing). The gap u2 is set to be smaller than the gap s2 (u2<s2). In other respects, the configuration is the same as in Embodiment 1.

As in Embodiment 1, in Embodiment 4, the gap u1 is also set smaller (narrower) than the gap s1 (u1<s1), as shown on the non-gear side in FIG. 27A. Therefore, a sum of movable amounts of the photosensitive drum 104 in the longitudinal direction (Y direction in the drawing) when the drum cover member 531 is mounted is u1+u2. Meanwhile, a sum of movable amounts of the photosensitive drum 104 in the longitudinal direction (Y direction in the drawing) when the drum cover member 531 is not mounted is s1+s2. Therefore, the length (range) of the distance in which the photosensitive drum 104 is allowed to move relative to the process cartridge 100 in the longitudinal direction is shortened (narrowed) by mounting the drum cover member 531 (u1+u2<s1+s2).

As described above, in the state where the drum cover member 531 is attached, it is possible to reduce the rubbing distance of the portion on the photosensitive drum 104 that is in contact with the charging roller 105. Therefore, it is possible to suppress the occurrence of charging memory due to rubbing of the contact portions of the photosensitive drum 104 and the charging roller 105 in the longitudinal direction. As a result, it is possible to provide the user with a good printed image.

Embodiment 5

A cartridge assembly according to Embodiment 5 of the present invention will be described with reference to FIGS. 28A and 28B. In the following description of Embodiment 5, the description of the configurations common to Embodiments 1, 2, 3, and 4 will be omitted. Matters not specifically described herein in Embodiment 5 are common to Embodiments 1, 2, 3, and 4. Parts in the configuration of Embodiment 5 are indicated by the reference numerals "541" plus a letter in Embodiment 5, as opposed to the reference numerals "501" plus a letter in Embodiment 1.

Figure 28A:
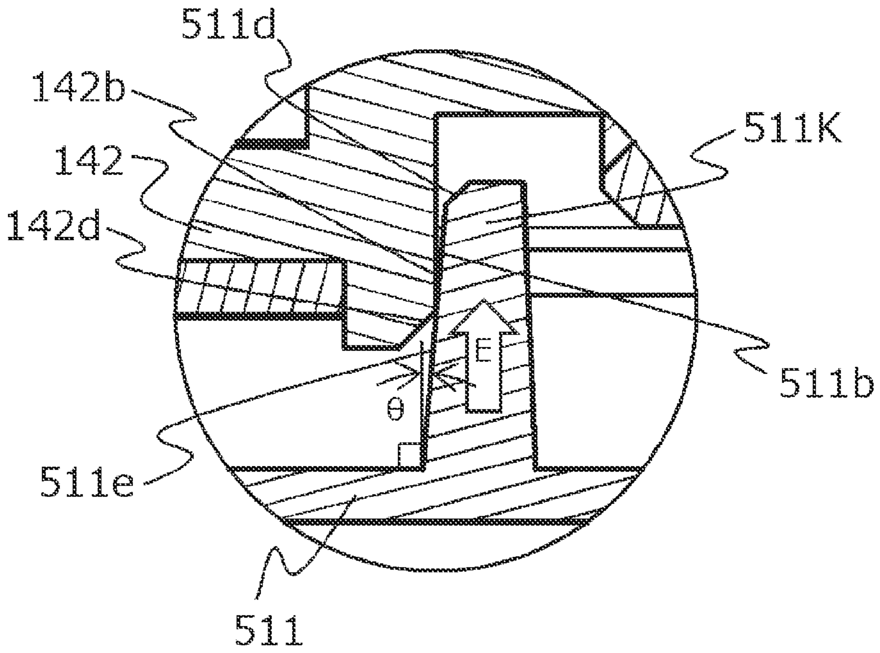
FIGS. 28A and 28B are a set of cross-sectional views for explaining the configuration of a limiting rib.
Figure 28B:
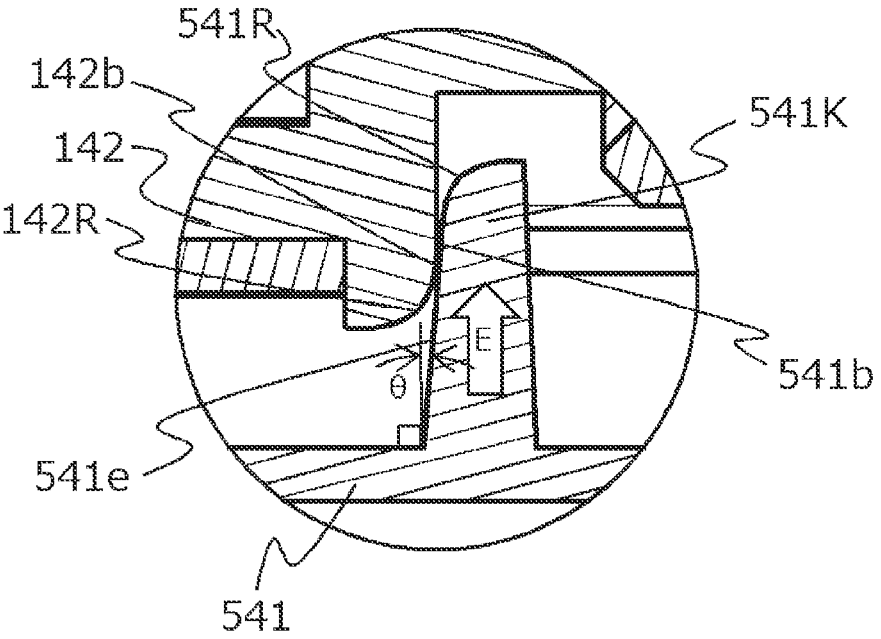

FIG. 28A is a detailed enlarged view 1 (DT1) of the periphery of the limiting rib 511K in FIG. 25A (Embodiment 2), and FIG. 28B is a detailed enlarged view 2 (DT2) of the periphery of a limiting rib 541K that differs in form from the limiting rib 511K. When assembling the drum cover member 511 (541) to the process cartridge 100, each component needs to be assembled in a desired longitudinal positional relationship.

In particular, when assembling the drum cover member 511 (541) toward the process cartridge 100 in a mounting direction E, contact or interference can occur between the members that are arranged close to each other between the drum cover member 511 (541) and the process cartridge 100. Such contact or interference may hinder the mounting of the drum cover member 511 (541). In Embodiment 5, the portions where such contact or interference may occur are provided with a shape for avoiding hindrance to mounting of the drum cover member 511 (541). That is, the corner portions of the tip end portions facing each other between the second limited portion 142b and the second limiting portion 511b (541b) when the drum cover member 511 (541) is mounted are provided with a chamfered shape 142d (511d) or a round shape 142R (541R). In the resultant configuration, the second limited portion 142b and the second limiting portion 511b (541b) contact and slide so as to lead each other. Therefore, the second limited portion 142b and the second limiting portion 511b (541b) are prevented from interfering with each other and being caught, thereby avoiding hindering the mounting of the drum cover member 511 (541).

Further, the end surface (side surface) of the limiting rib 511K (541K) facing the second limited portion 142b in the longitudinal direction (Y2 direction) may have a tapered shape 511e (541e). The tapered shape 511e (541e) is an inclined surface shape that is inclined at an angle θ with respect to a direction perpendicular to the longitudinal direction so as to recede in the direction (Y1 direction) opposite to the direction (Y2 direction) facing the second limited portion 142b as the tip end side of the limiting rib 511K (541K) is approached.

As a result, when the drum cover member 511 (541) is assembled to the process cartridge 100, it becomes easier to assemble the components in a desired longitudinal positional relationship. Further, the configuration shown in the present embodiment can be applied not only to the second limited portion 142b and the second limiting portion 511b (541b), but also to other limited portions and limiting portions to obtain the same effect.

Figure 25B:
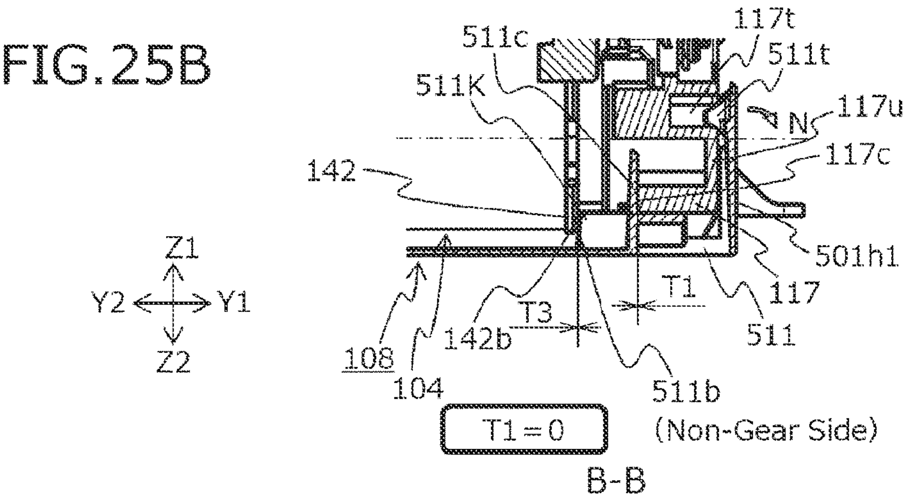

Further, in the present embodiment, the case where the characteristic configuration of the present embodiment is applied to the limiting rib 511K shown in FIGS. 25A and 25B (Embodiment 2) is described, but such a configuration may be applied to other embodiments as well. Thus, the gap u1 in the DT1 portion in the figure is also present in FIG. 1A (Embodiment 1), FIG. 26A (Embodiment 3), and FIG. 27A (Embodiment 4), but the problem described above may occur when assembling the drum cover member toward the process cartridge 100 in the mounting direction E. Therefore, the interference avoidance shape shown in FIGS. 28A and 28B may be applied to each limiting rib.

Embodiment 6

Embodiment 6 of the present invention will be described hereinbelow. Embodiment 6 illustrates an example of materials used for the drum cover members 501, 511, 521, 531, and 541 of Embodiments 1 to 5. In the following description of Embodiment 6, the description of the configurations common to those of Embodiments 1 to 5 will be omitted. Matters not specifically described herein in Embodiment 6 are common to Embodiments 1 to 5.

As described in Embodiments 1 to 5, in a state with the drum cover member attached to the process cartridge 100, printing is not performed. Therefore, even if the related parts come into contact with each other, it is assumed that this can be dealt with by deformation of the constituent parts. In order to achieve the effect of deformation more reliably, in the present embodiment, the drum cover member is configured of a material that is more deformable than the material of the frame constituting the drum unit 108, that is, a material with a low Young's modulus. As a result, the deformation caused by the aforementioned contact can be more reliably absorbed by the deformation of the drum cover member. The frame constituting the drum unit 108 corresponds to the drum frame 115, the gear-side cartridge cover member 116 and the non-gear side cartridge cover member 117. In the present embodiment, a polystyrene-based resin material is used for the frame constituting the drum unit 108, and a polypropylene-based resin material is used for the drum cover member. These specific materials are merely examples. That is, a combination of materials different from the above materials may be used as long as the combination of materials produces a desired difference in deformability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-151117, filed on Sep. 16, 2021, which is hereby incorporated by reference herein in its entirety.

What is claimed is:

1. A cartridge assembly comprising:
- a cartridge including:
  - a photosensitive drum; and
  - a frame rotatably supporting the photosensitive drum and covering the photosensitive drum so as to expose a portion of a peripheral surface of the photosensitive drum; and
- a cover member covering a part of the portion of the photosensitive drum and being attachable and detachable to the frame,
- wherein the frame is configured to limit a movable amount of the photosensitive drum with respect to the frame in a longitudinal direction of the photosensitive drum to a first amount by contacting the photosensitive drum in the case where the cover member is detached from the frame and where the photosensitive drum is moved in the longitudinal direction,
- wherein the cover member includes:
  - a held portion held by the frame; and
  - a limiting portion configured to limit the movable amount to a second amount that is less than the first amount by contacting with the photosensitive drum in a case where the photosensitive drum is moved in the longitudinal direction.

2. The cartridge assembly according to claim 1, wherein the limiting portion is a protruding portion protruding in a direction intersecting the longitudinal direction so as to have an overlapping portion overlapping with the photosensitive drum as viewed in the longitudinal direction.

3. The cartridge assembly according to claim 2, wherein the frame includes:
- a first end supporting portion supporting a first end portion of the photosensitive drum in the longitudinal direction; and
- a second end supporting portion supporting a second end portion of the photosensitive drum that is opposite to the first end portion, and
- wherein the protruding portion is provided in a gap between the first end portion and the first end supporting portion.

4. The cartridge assembly according to claim 3, wherein the first end supporting portion includes a first limiting surface facing the first end portion in a first direction along the longitudinal direction,
- wherein the second end supporting portion includes a second limiting surface facing the second end portion in a second direction that is opposite to the first direction,
- wherein the first amount is a sum of a distance of a gap between the first end portion and the first limiting surface in the longitudinal direction and a distance of a gap between the second end portion and the second limiting surface in the longitudinal direction, and
- wherein a first sum of a distance of a gap between the first end portion and the protruding portion in the longitudinal direction and a distance of a gap between the second end portion and the second limiting surface in the longitudinal direction is less than a second sum of a distance of a gap the first end portion and the first limiting surface in the longitudinal direction and a distance of a gap between the second end portion and the second limiting surface in the longitudinal direction.

5. The cartridge assembly according to claim 4, wherein the held portion includes:
- a first engaging portion engaging with the frame so as to prevent the cover member from being moved away from the frame in a direction intersecting with the longitudinal direction;
- a second engaging portion engaging with the frame so as to prevent the cover member from being moved away from the frame in a direction intersecting with the longitudinal direction; and
- a cover portion extending in a direction along with the longitudinal direction between the first engaging portion and the second engaging portion and facing the portion of the photosensitive drum exposed from the frame, and
- wherein the protruding portion protrudes from the cover portion into a gap between the first end portion and the first end supporting portion in a direction intersecting with the longitudinal direction.

6. The cartridge assembly according to claim 5, wherein the first end supporting portion includes a first concave portion depressed in the first direction from an outer end surface of the first end supporting portion in the longitudinal direction,
- wherein the second end supporting portion includes a second concave portion depressed in the second direction from an outer end surface of the second end supporting portion in the longitudinal direction,
- wherein the first engaging portion includes:
  - a first extending portion extending in a direction intersecting with the longitudinal direction from a side where the cover portion is provided on the cover member so as to have an overlapping portion overlapping with the first concave portion as viewed in the longitudinal direction; and
  - a first convex portion protruding in the first direction from the first extending portion and engaging with the first concave portion, and
- wherein the second engaging portion includes:
  - a second extending portion extending in a direction intersecting with the longitudinal direction from a side where the cover portion is provided on the cover member so as to have an overlapping portion overlapping with the second concave portion as viewed in the longitudinal direction; and
  - a second convex portion protruding in the second direction from the second extending portion and engaging with the second concave portion.

7. The cartridge assembly according to claim 3, wherein, in a case where the protruding portion faces the first end portion in a first direction along with the longitudinal direction and the protruding portion is a first protruding portion and the cover member further includes a second protruding portion in a gap between the second end portion and the second end supporting portion, the second protruding portion extending in a direction intersecting with the longitudinal direction so as to have an overlapping portion overlapping with the second end portion as viewed in the longitudinal direction and facing the second end portion in a second direction opposite to the first direction, and wherein a sum of a distance of a gap between the first protruding portion and the first end portion in the longitudinal direction and a distance of a gap between the second protruding portion and the second end portion in the longitudinal direction is less than the first amount.

8. The cartridge assembly according to claim 3, wherein, in a case where the protruding portion faces the first end portion in a first direction along with the longitudinal direction and the protruding portion is a first protruding portion, the cover member further includes a second protruding portion and a third protruding portion, the third protruding portion provided in a gap between the first end portion and the first end supporting portion, extending in a direction intersecting with the longitudinal direction so as to have an overlapping portion overlapping with the first end portion as viewed in the longitudinal direction and abutting with the first end supporting portion in a second direction opposite to the first direction.

9. The cartridge assembly according to claim 2, wherein the protruding portion has a corner portion on a tip end portion of the protruding portion, the tip end portion facing an end portion of the photosensitive drum, the corner portion having a chamfered shape or a round shape.

* * * * *